US012165659B2

(12) United States Patent
Sugiura et al.

(10) Patent No.: US 12,165,659 B2
(45) Date of Patent: *Dec. 10, 2024

(54) SOUND SIGNAL DOWNMIXING METHOD, SOUND SIGNAL CODING METHOD, SOUND SIGNAL DOWNMIXING APPARATUS, SOUND SIGNAL CODING APPARATUS, PROGRAM AND RECORDING MEDIUM

(71) Applicant: NIPPON TELEGRAPH AND TELEPHONE CORPORATION, Tokyo (JP)

(72) Inventors: Ryosuke Sugiura, Tokyo (JP); Takehiro Moriya, Tokyo (JP); Yutaka Kamamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 17/908,965

(22) PCT Filed: Feb. 8, 2021

(86) PCT No.: PCT/JP2021/004639

§ 371 (c)(1),
(2) Date: Sep. 2, 2022

(87) PCT Pub. No.: WO2021/181974

PCT Pub. Date: Sep. 16, 2021

(65) Prior Publication Data

US 2023/0106764 A1 Apr. 6, 2023

(30) Foreign Application Priority Data

Mar. 9, 2020 (WO) .................. PCT/JP2020/010080
Mar. 9, 2020 (WO) .................. PCT/JP2020/010081
Nov. 4, 2020 (WO) .................. PCT/JP2020/041216

(51) Int. Cl.
*G10L 19/008* (2013.01)
*G10L 19/24* (2013.01)
(Continued)

(52) U.S. Cl.
CPC ............ *G10L 19/008* (2013.01); *G10L 19/24* (2013.01); *H04S 1/007* (2013.01); *H04S 7/30* (2013.01); *H04S 2400/03* (2013.01)

(58) Field of Classification Search
CPC ........ H04S 1/007; H04S 7/30; H04S 2400/03; G10L 19/008; G10L 19/24
(Continued)

(56) References Cited

U.S. PATENT DOCUMENTS 10,839,812 B2 * 11/2020 Dick .......................... H04S 3/02
11,017,785 B2 * 5/2021 Purnhagen .............. H04S 5/005
(Continued)

FOREIGN PATENT DOCUMENTS

WO 2006070751 A1 7/2006

*Primary Examiner* — Disler Paul

(57) ABSTRACT

A sound signal downmix method includes an inter-channel relationship information obtaining step of obtaining an inter-channel correlation value and preceding channel information of every pair of two channels included in N channels, the inter-channel correlation value being a value indicating a degree of a correlation between input sound signals of the two channels, the preceding channel information being information indicating which of the input sound signals of the two channels is preceding, and a downmix step of obtaining a downmix signal by weighting and adding the input sound signals of the N channels, the input sound signal of each channel being weighted based on the inter-channel correlation value and the preceding channel information such that the larger a correlation with an input sound signal of a preceding channel that precedes the channel, the smaller a weight, whereas the larger a correlation with an input
(Continued)

sound signal of a succeeding channel that succeeds the channel, the larger the weight.

8 Claims, 17 Drawing Sheets

(51) Int. Cl.
*H04S 1/00* (2006.01)
*H04S 7/00* (2006.01)

(58) Field of Classification Search
USPC ........................................................ 381/22–23
See application file for complete search history.

(56) References Cited

U.S. PATENT DOCUMENTS

| | | | | |
|---|---|---|---|---|
| 11,133,013 | B2 * | 9/2021 | Purnhagen | H04S 5/00 |
| 11,462,224 | B2 * | 10/2022 | Wang | H04S 1/007 |
| 11,545,165 | B2 * | 1/2023 | Nagisetty | G10L 19/0212 |
| 11,568,882 | B2 * | 1/2023 | Zhang | G10L 19/008 |
| 11,881,255 | B2 * | 1/2024 | Lee | G11C 29/028 |
| 2008/0010072 | A1 | 1/2008 | Yoshida et al. | |

* cited by examiner

SOUND SIGNAL DOWNMIXING METHOD, SOUND SIGNAL CODING METHOD, SOUND SIGNAL DOWNMIXING APPARATUS, SOUND SIGNAL CODING APPARATUS, PROGRAM AND RECORDING MEDIUM

CROSS-REFERENCE TO RELATED APPLICATIONS

This application is a U.S. National Stage Application filed under 35 U.S.C. § 371 claiming priority to International Patent Application No. PCT/JP2021/004639, filed on 8 Feb. 2021, which application claims priority to and the benefit of International Patent Application No. PCT/JP2020/010080, filed on 9 Mar. 2020; International Patent Application No. PCT/JP2020/010081, filed on 9 Mar. 2020; and International Patent Application No. PCT/JP2020/041216, filed on 4 Nov. 2020, the disclosures of which are hereby incorporated herein by reference in their entireties.

TECHNICAL FIELD

The present disclosure relates to a technique of obtaining a monaural sound signal from a plurality of channel sound signals for the purpose of monaural coding of a sound signal, coding of a sound signal by a combination of monaural coding and stereo coding, monaural signal processing of a sound signal, and signal processing of a stereo sound signal using a monaural sound signal.

BACKGROUND ART

A technique of obtaining a monaural sound signal from a 2-channel sound signal and performing embedded coding/decoding of the 2-channel sound signal and the monaural sound signal is disclosed in PTL 1. PTL 1 discloses a technique in which a monaural signal is obtained by averaging an input left-channel sound signal and an input right-channel sound signal for each corresponding sample, a monaural code is obtained by coding (monaural coding) the monaural signal, a monaural local decoding signal is obtained by decoding (monaural decoding) the monaural code, and the difference (predictive residual signal) of a predictive signal obtained from the monaural local decoding signal and the input sound signal is coded for each of the left channel and the right channel. In the technique disclosed in PTL 1, for each channel, the degradation of the sound quality of the decoding sound signal of each channel is suppressed by selecting a predictive signal, which is set as a signal provided with an amplitude ratio by delaying the monaural local decoding signal, with a delay and an amplitude ratio achieving a minimum error between the input sound signal and the predictive signal, or by subtracting a predictive signal from the input sound signal by using a predictive signal with a delay and an amplitude ratio that maximizes the mutual correlation between the input sound signal and the monaural local decoding signal, so as to obtain a predictive residual signal to be subjected to coding/decoding.

CITATION LIST

Patent Literature

PTL 1 WO2006/070751

SUMMARY OF THE INVENTION

Technical Problem

In the technique disclosed in PTL 1, the coding efficiency for each channel can be increased by optimizing the delay and the amplitude ratio given to the monaural local decoding signal when obtaining the predictive signal. In the technique disclosed in PTL 1, however, the monaural local decoding signal is obtained by coding/decoding the monaural signal obtained by averaging the left-channel sound signal and the right-channel sound signal. That is, the technique disclosed in PTL 1 is disadvantageous in that no contrivance is made to obtain a monaural signal useful for signal processing such as coding processing from a sound signal of a plurality of channels.

An object of the present disclosure is to provide a technique for obtaining a monaural signal useful for signal processing such as coding processing from a sound signal of a plurality of channels.

Means for Solving the Problem

A sound signal downmix method according to an aspect of the present invention is a method of obtaining a downmix signal that is a monaural sound signal from input sound signals of N channels, N being an integer of three or greater, the sound signal downmix method includes an inter-channel relationship information obtaining step of obtaining an inter-channel correlation value and preceding channel information of every pair of two channels included in the N channels, the inter-channel correlation value being a value indicating a degree of a correlation between input sound signals of the two channels, the preceding channel information being information indicating which of the input sound signals of the two channels is preceding, and a downmix step of obtaining the downmix signal by weighting and adding the input sound signals of the N channels, the input sound signal of each channel being weighted based on the inter-channel correlation value and the preceding channel information such that the larger a correlation with an input sound signal of a preceding channel that precedes the channel, the smaller a weight, whereas the larger a correlation with an input sound signal of a succeeding channel that succeeds the channel, the larger the weight.

A sound signal coding method according to an aspect of the present invention includes the sound signal downmix method as a sound signal downmix step, a monaural coding step of obtaining a monaural code by coding the downmix signal obtained in the downmix step, and a stereo coding step of obtaining a stereo code by coding the input sound signals of the N channels.

Effects of the Invention

According to the present disclosure, it is possible to obtain a monaural signal useful for signal processing such as coding processing from a sound signal of a plurality of channels.

DESCRIPTION OF EMBODIMENTS

First Embodiment

Figure 1:
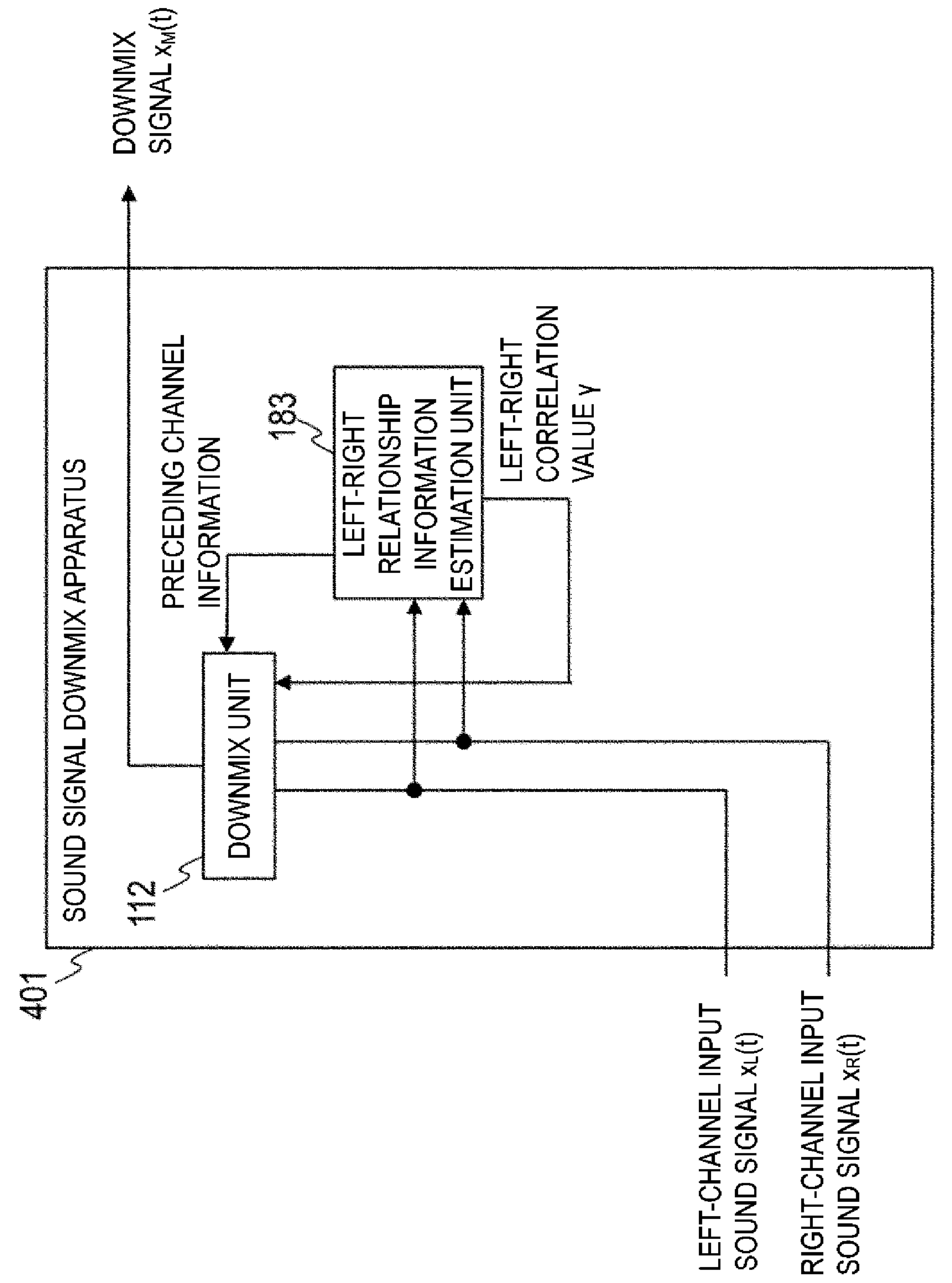
FIG. 1 is a block diagram illustrating a sound signal downmix apparatus of a first example of a first embodiment.

A 2-channel sound signal that is the target of signal processing such as coding processing is often a digital sound signal obtained through an AD conversion of sounds picked up by a left-channel microphone and a right-channel microphone disposed in a certain space. In this case, a left-channel input sound signal, which is a digital sound signal obtained through an AD conversion of a sound picked up by the left-channel microphone disposed in the space, and a right-channel input sound signal, which is a digital sound signal obtained through an AD conversion of a sound picked up by the right-channel microphone disposed in the space, are input to an apparatus for performing signal processing such as coding processing. The left-channel input sound signal and right-channel input sound signal each include the sound output by each sound source in the space with a given difference (so-called arrival time difference) between the arrival time at the left-channel microphone from the sound source and the arrival time at the right-channel microphone from the sound source.

In the above-described technique disclosed in PTL 1, a predictive residual signal is obtained by subtracting, from an input sound signal, a predictive signal, which is a monaural local decoding signal provided with a delay and an amplitude ratio, and the predictive residual signal is subjected to coding/decoding. That is, for each channel, the higher the similarity between the input sound signal and the monaural local decoding signal, the higher the efficiency of the coding. However, for example, in the case where only a sound output by one sound source in a certain space is included in the left-channel input sound signal and the right-channel input sound signal with a given arrival time difference, and the monaural local decoding signal is a signal obtained by coding/decoding a monaural signal obtained by averaging the left-channel sound signal and the right-channel sound signal, the similarity of the left-channel sound signal and the monaural local decoding signal is not significantly high, and the similarity of the right-channel sound signal and the monaural local decoding signal is also not significantly high, even though the left-channel sound signal, the right-channel sound signal, and the monaural local decoding signal each include only a sound output by the same single sound source. In this manner, when a monaural signal is obtained by only averaging the left-channel sound signal and the right-channel sound signal, a monaural signal useful for signal processing such as coding processing cannot be obtained in some situation.

In view of this, a sound signal downmix apparatus of a first embodiment performs downmix processing that takes into account the relationship between the left-channel input sound signal and the right-channel input sound signal so that a monaural signal useful for signal processing such as coding processing can be obtained. The sound signal downmix apparatus of the first embodiment will be described below.

First Example

First, a sound signal downmix apparatus of a first example of the first embodiment will be described. As illustrated in FIG. 1, a sound signal downmix apparatus 401 of the first example includes a left-right relationship information estimation unit 183 and a downmix unit 112. The sound signal downmix apparatus 401 obtains a downmix signal described later from an input 2-channel stereo time-domain sound signal in a frame unit of a predetermined time length of, for example, 20 ms and outputs the downmix signal. A 2-channel stereo time-domain sound signal input to the sound signal downmix apparatus 401 is, for example, a digital sound signal obtained through an AD conversion of a sound such as a voice and music picked up by each of two microphones, a digital decoded sound signal obtained by coding/decoding the digital sound signal, and a digital signal processed sound signal obtained through signal processing of the digital sound signal. The 2-channel stereo time-domain sound signal is composed of a left-channel input sound signal and a right-channel input sound signal. A downmix signal, which is a time-domain monaural sound signal obtained by the sound signal downmix apparatus 401, is input to a coding apparatus that performs coding of at least the downmix signal and a signal processing apparatus that performs signal processing of at least the downmix signal.

Figure 2:
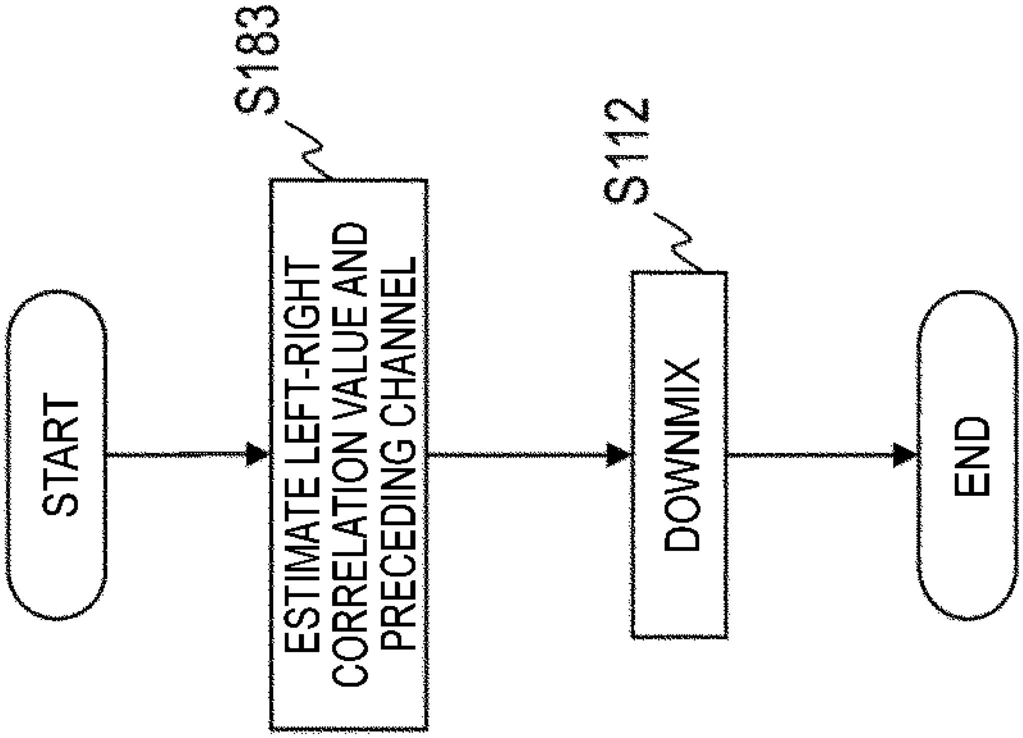
FIG. 2 is a flowchart of processing of the sound signal downmix apparatus of the first example of the first embodiment.

When the number of samples per frame is T, left-channel input sound signals $x_L(1)$, $x_L(2)$ . . . , $x_L(t)$ and right-channel input sound signals $x_R(1)$, $x_R(2)$ . . . , $x_R(t)$ are input to the sound signal downmix apparatus 401 in a frame unit, and the sound signal downmix apparatus 401 obtains and outputs downmix signals $x_M(1)$, $x_M(2)$ . . . , $x_M(T)$ in a frame unit. Here, T is a positive integer, and for example, when the frame length is 20 ms and the sampling frequency is 32 kHz, T is 640. The sound signal downmix apparatus 401 of the first example performs processing of step S183 and step S112 exemplified in FIG. 2 for each frame.

Left-Right Relationship Information Estimation Unit 183

A left-channel input sound signal input to the sound signal downmix apparatus 401 and a right-channel input sound signal input to the sound signal downmix apparatus 401 are input to the left-right relationship information estimation unit 183. The left-right relationship information estimation unit 183 obtains a left-right correlation value $\gamma$ and preceding channel information from the left-channel input sound signal and the right-channel input sound signal and outputs the left-right correlation value $\gamma$ and the preceding channel information (step S183).

The preceding channel information is information representing whether a sound output by a main sound source in a certain space has arrived first at the left-channel microphone disposed in the space or the right-channel microphone disposed in the space. That is, the preceding channel information is information indicating whether the same sound signal is included first in the left-channel input sound signal or the right-channel input sound signal. When the case where the same sound signal is included first in the left-channel input sound signal is referred to as "the left channel is preceding" or "the right channel is succeeding" and the case where the same sound signal is included first in the right-channel input sound signal is referred to as "the right channel is preceding" or "the left channel is succeeding", the preceding channel information is information indicating which of the left channel and the right channel is preceding. The left-right correlation value $\gamma$ is a correlation value that takes into account the time difference between the left-channel input sound signal and the right-channel input sound signal. That is, the left-right correlation value $\gamma$ is a value indicating the degree of the correlation between the sample sequence of the input sound signal of the preceding channel and the sample sequence of the input sound signal of the succeeding channel shifted backward by $\tau$ samples relative to the sample sequence of the preceding channel. In the following description, $\tau$ is also referred to as a left-right time difference. The preceding channel information and the left-right correlation value $\gamma$ are information indicating the relationship between the left-channel input sound signal and the right-channel input sound signal, and therefore can be referred to as left-right relationship information.

A case where, for example, the absolute value of a correlation coefficient is used as a value indicating the degree of the correlation will be described. For each candidate number of samples $\tau_{cand}$ from $\tau_{max}$ to $\tau_{min}$ set in advance (for example, $\tau_{max}$ is a positive number and $\tau_{min}$ is a negative number), the left-right relationship information estimation unit 183 obtains and outputs, as the left-right correlation value $\gamma$, a maximum value of an absolute value $\gamma_{cand}$ of the correlation coefficient between the sample sequence of the left-channel input sound signal and the sample sequence of the right-channel input sound signal shifted backward relative to the sample sequence of the left-channel input sound signal by the candidate number of samples $\tau_{cand}$, obtains and outputs information indicating that the left channel is preceding as the preceding channel information in the case where $\tau_{cand}$ when the absolute value of the correlation coefficient is a maximum value is a positive value, and obtains and outputs information indicating that the right channel is preceding as the preceding channel information in the case where $\tau_{cand}$ when the absolute value of the correlation coefficient is a maximum value is a negative value. In the case where $\tau_{cand}$ when the absolute value of the correlation coefficient is a maximum value is zero, the left-right relationship information estimation unit 183 may obtain and output information indicating that the left channel is preceding as the preceding channel information or obtain and output information indicating that the right channel is preceding as the preceding channel information, while it is preferable to obtain and output information indicating that no channel is preceding as the preceding channel information.

Each candidate number of samples set in advance may be an integer value from $\tau_{max}$ to $\tau_{min}$, may include fractions and decimals between $\tau_{max}$ and $\tau_{min}$, and may not include any of integer values between $\tau_{max}$ and $\tau_{min}$. In addition, $\tau_{max}$ may or may not be equal to $\tau_{min}$. When it is assumed that an input sound signal whose preceding channel is unknown is targeted, it is preferable that $\tau_{max}$ be a positive number and that $\tau_{min}$ be a negative number. When a special input sound signal in which any of channels is necessarily preceding is targeted, both $\tau_{max}$ and $\tau_{min}$ may be positive numbers, or negative numbers. To calculate the absolute value $\gamma_{cand}$ of the correlation coefficient, one or more samples of a past input sound signal continuous to the sample sequence of the input sound signal of the current frame may also be used. In this case, it suffices to store the sample sequences of the input sound signals in a predetermined number of past frames in a storage unit not illustrated in the drawing in the left-right relationship information estimation unit 183.

In addition, for example, instead of the absolute value of the correlation coefficient, a correlation value using information about a phase of a signal may be set as $\gamma_{cand}$ as follows. In this example, the left-right relationship information estimation unit 183 first obtains frequency spectra $X_L(k)$ and $X_R(k)$ at each frequency k of 0 to T−1 by performing Fourier transform on each of the left-channel input sound signals $x_L(1)$, $x_L(2)$ . . . , $x_L(t)$ and the right-channel input sound signals $x_R(1)$, $x_R(2)$ . . . , $x_R(t)$ as in the following Equation (1-1) and Equation (1-2).

[Math. 1]

$$X_L(k) = \frac{1}{\sqrt{T}} \sum_{t=0}^{T-1} x_L(t+1) e^{-j\frac{2\pi kt}{T}} \quad (1\text{-}1)$$

[Math. 2]

$$X_R(k) = \frac{1}{\sqrt{T}} \sum_{t=0}^{T-1} x_R(t+1) e^{-j\frac{2\pi kt}{T}} \quad (1\text{-}2)$$

Next, the left-right relationship information estimation unit 183 obtains a phase difference spectrum $\varphi(k)$ at each frequency k through the following Equation (1-3) by using the frequency spectra $X_L(k)$ and $X_R(k)$ at each frequency k obtained through Equation (1-1) and Equation (1-2).

[Math. 3]

$$\phi(k) = \frac{X_L(k)/|X_L(k)|}{X_R(k)/|X_R(k)|} \tag{1-3}$$

Next, the left-right relationship information estimation unit 183 obtains a phase difference signal $\psi(\tau_{cand})$ for each candidate number of samples $\tau_{cand}$ from $\tau_{max}$ to $\tau_{min}$ as in the following Equation (1-4) by performing inverse Fourier transform on the phase difference spectrum obtained through Equation (1-3).

[Math. 4]

$$\psi(\tau_{cand}) = \frac{1}{\sqrt{T}} \sum_{k=0}^{T-1} \phi(k) e^{j\frac{2\pi k \tau_{cand}}{T}} \tag{1-4}$$

The absolute value of the phase difference signal $\psi(\tau_{cand})$ obtained through Equation (1-4) represents some kind of correlation corresponding to the plausibility of the time difference between the left-channel input sound signals $x_L(1)$, $x_L(2)$ . . . , $x_L(t)$ and the right-channel input sound signals $x_R(1)$, $x_R(2)$ . . . , $x_R(t)$, and therefore the left-right relationship information estimation unit 183 uses, as a correlation value $\gamma_{cand}$, the absolute value of the phase difference signal $\psi(\tau_{cand})$ for each candidate number of samples $\tau_{cand}$. Specifically, the left-right relationship information estimation unit 183 obtains and outputs a maximum value of the correlation value $\gamma_{cand}$ that is the absolute value of the phase difference signal $\psi(\tau_{cand})$ as the left-right correlation value $\gamma$, obtains and outputs information indicating that the left channel is preceding as the preceding channel information in the case where $\tau_{cand}$ when the correlation value is a maximum value is a positive value, and obtains and outputs information indicating that the right channel is preceding as the preceding channel information in the case where $\tau_{cand}$ when the correlation value is a maximum value is a negative value. In the case where $\tau_{cand}$ when the correlation value is a maximum value is zero, the left-right relationship information estimation unit 183 may obtain and output information indicating that the left channel is preceding as the preceding channel information, and may obtain and output information indicating that the right channel is preceding as the preceding channel information, while it is preferable to obtain and output information indicating that no channel is preceding as the preceding channel information. Note that instead of using as it is the absolute value of the phase difference signal $\psi(\tau_{cand})$ as the correlation value $\gamma_{cand}$, the left-right relationship information estimation unit 183 may use a normalized value such as a relative difference between the average of the absolute values of phase difference signals obtained for a plurality of candidate numbers of samples before and after $\tau_{cand}$ and the absolute value of the phase difference signal $\psi(\tau_{cand})$ for each $\tau_{cand}$, for example. That is, the left-right relationship information estimation unit 183 may use, as $\gamma_{cand}$, a normalized correlation value obtained by obtaining an average value through the following Equation (1-5) using the positive number $\tau_{range}$ set in advance for each $\tau_{cand}$, and by using the following Equation (1-6) using the obtained average value $\psi_c(\tau_{cand})$ and phase difference signal $\psi(\tau_{cand})$.

[Math. 5]

$$\psi_c(\tau_{cand}) = \frac{1}{2\tau_{range}+1} \sum_{\tau'=\tau_{cand}-\tau_{range}}^{\tau_{cand}+\tau_{range}} |\psi(\tau')| \tag{1-5}$$

[Math. 6]

$$1 - \frac{\psi_c(\tau_{cand})}{|\psi(\tau_{cand})|} \tag{1-6}$$

Note that the normalized correlation value obtained through Equation (1-6) is a value from 0 to 1, with a property in which the higher the plausibility of $\tau_{cand}$ as the left-right time difference, the closer it is to 1, whereas the lower the plausibility of $\tau_{cand}$ as the left-right time difference, the closer it is to 0.

Downmix Unit 112

The left-channel input sound signal input to the sound signal downmix apparatus 401, the right-channel input sound signal input to the sound signal downmix apparatus 401, the left-right correlation value $\gamma$ output by the left-right relationship information estimation unit 183, and the preceding channel information output by the left-right relationship information estimation unit 183 are input to the downmix unit 112. The downmix unit 112 obtains a downmix signal by weighting and averaging the left-channel input sound signal and the right-channel input sound signal such that as the left-right correlation value $\gamma$ becomes larger, the input sound signal of the preceding channel of the left-channel input sound signal and the right-channel input sound signal is more included in the downmix signal, and the downmix unit 112 outputs the downmix signal (step S112).

For example, in the case where the absolute value of the correlation coefficient and the normalized value are used for the correlation value as in the above-described example of the left-right relationship information estimation unit 183, the left-right correlation value $\gamma$ input from the left-right relationship information estimation unit 183 is a value from 0 to 1. Therefore, the downmix unit 112 may obtain a downmix signal $x_M(t)$ obtained by weighting and adding the left-channel input sound signal $x_L(t)$ and the right-channel input sound signal $x_R(t)$ by using the weight set by the left-right correlation value $\gamma$ for each corresponding sample number t. To be more specific, the downmix unit 112 may obtain the downmix signal $x_M(t)$ as $x_M(t)=((1+\gamma)/2)\times x_L(t)+((1-\gamma)/2)\times x_R(t)$ in the case where the preceding channel information is information indicating that the left channel is preceding, that is, in the case where the left channel is preceding, and the downmix unit 112 may obtain the downmix signal $x_M(t)$ as $x_M(t)=((1-\gamma)/2)\times x_L(t)+((1+\gamma)/2)\times x_R(t)$ in the case where the preceding channel information is information indicating that the right channel is preceding, that is, in the case where the right channel is preceding. When the downmix unit 112 obtains the downmix signal in the above-described manner, the smaller the left-right correlation value $\gamma$, that is, the smaller the correlation of the left-channel input sound signal and the right-channel input sound signal, the downmix signal is similar to a signal obtained by averaging the left-channel input sound signal and the right-channel input sound signal, whereas the larger the left-right correlation value $\gamma$, that is, the larger the correlation of the left-channel input sound signal and the right-channel input sound signal, the downmix signal is similar to the input sound signal of the preceding channel of the left-channel input sound signal and the right-channel input sound signal.

Note that in the case where no channel is preceding, it is preferable that the downmix unit 112 obtain and output the downmix signal by averaging the left-channel input sound signal and the right-channel input sound signal such that the left-channel input sound signal and the right-channel input sound signal are included in the downmix signal with the same weight. That is, in the case where the preceding channel information indicates that no channel is preceding, the downmix unit 112 preferably obtains, for each sample number t, the downmix signal $x_M(t)$ as $x_M(t)=(x_L(t)+x_R(t))/2$ obtained by averaging the left-channel input sound signal $x_L(t)$ and the right-channel input sound signal $x_R(t)$.

Second Example

For example, in the case where an apparatus different from the sound signal downmix apparatus performs stereo coding processing of the left-channel input sound signal and the right-channel input sound signal, and in the case where the left-channel input sound signal and the right-channel input sound signal are signals obtained through the stereo decoding processing in an apparatus different from the sound signal downmix apparatus signal, either one or both of the preceding channel information and the left-right correlation value γ identical to that obtained by the left-right relationship information estimation unit 183 can possibly be obtained in the apparatus different from the sound signal downmix apparatus. In the case where either one or both of the left-right correlation value γ and the preceding channel information has been obtained in the different apparatus, either one or both of the left-right correlation value γ and the preceding channel information obtained in the different apparatus is input to the sound signal downmix apparatus, and the left-right relationship information estimation unit 183 obtains the left-right correlation value γ or the preceding channel information that has not been input to the sound signal downmix apparatus. Below, a second example, which is an example of the sound signal downmix apparatus on the assumption that either one or both of the left-right correlation value γ and the preceding channel information is input from the outside, will be described mainly about differences from the first example.

Figure 3:
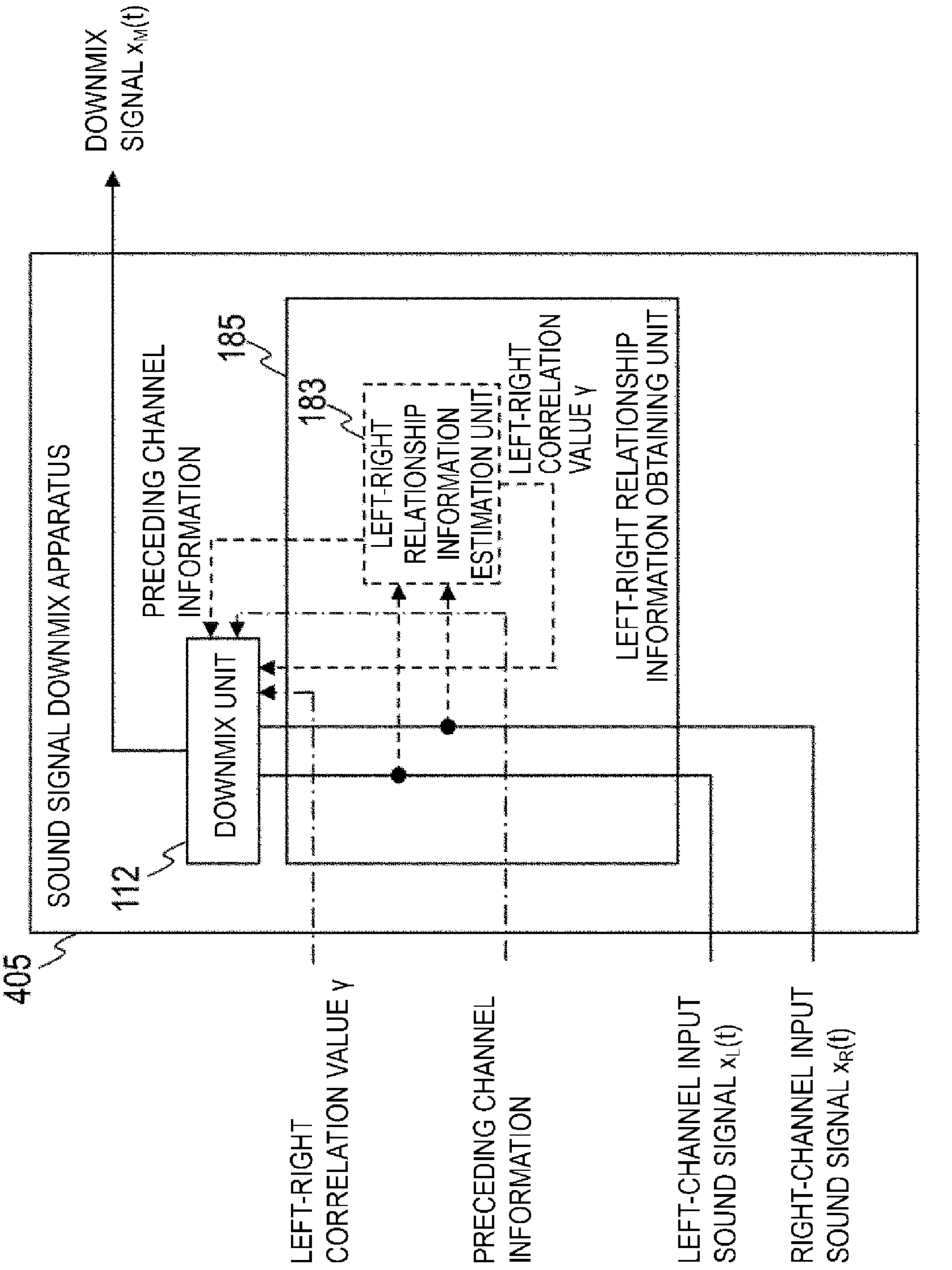
FIG. 3 is a block diagram illustrating an example of a sound signal downmix apparatus of a second example of the first embodiment.
Figure 4:
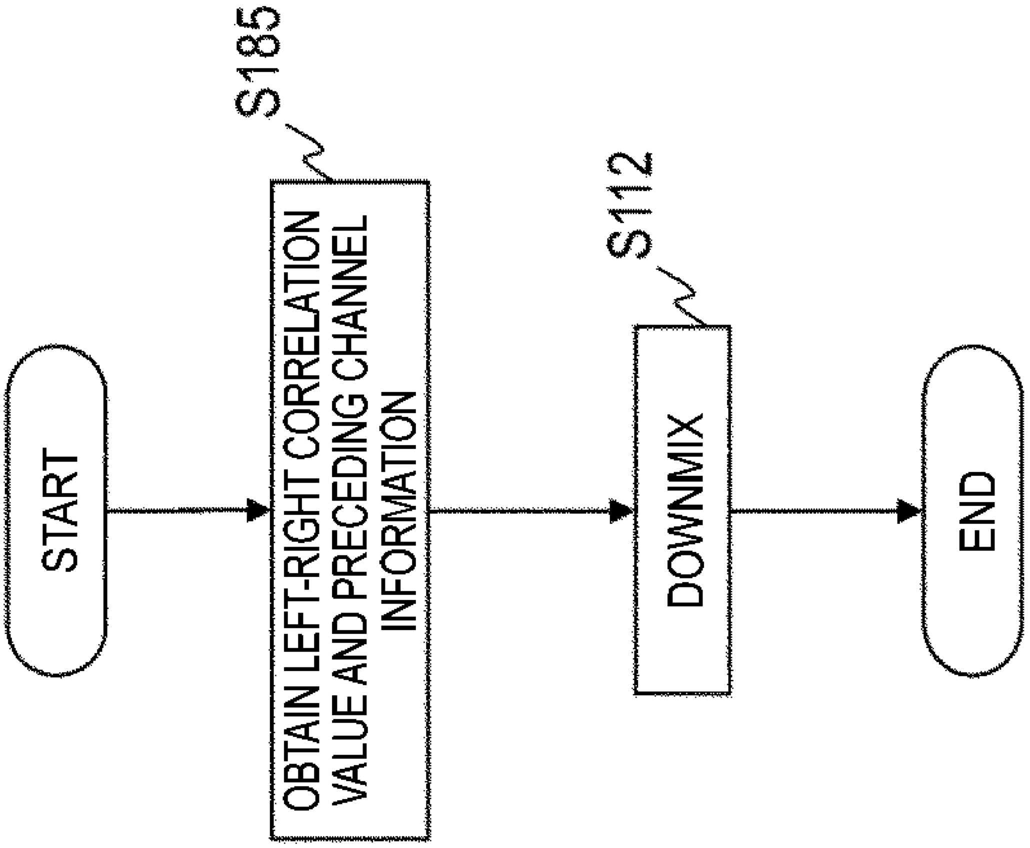
FIG. 4 is a flowchart of an example of processing of the sound signal downmix apparatus of the second example of the first embodiment.

As illustrated in FIG. 3, a sound signal downmix apparatus 405 of the second example includes a left-right relationship information obtaining unit 185 and the downmix unit 112. As indicated by the dashed line in FIG. 3, either one or both of the left-right correlation value γ and the preceding channel information obtained by a different apparatus may be input to the sound signal downmix apparatus 405, in addition to the left-channel input sound signal and the right-channel input sound signal. The sound signal downmix apparatus 405 of the second example performs processing of step S185 and step S112 exemplified in FIG. 4 for each frame. The downmix unit 112 and step S112 are identical to those of the first example, and therefore the left-right relationship information obtaining unit 185 and step S185 will be described below.

Left-Right Relationship Information Obtaining Unit 185

The left-right relationship information obtaining unit 185 obtains and outputs the left-right correlation value γ, which is a value indicating the degree of the correlation of the left-channel input sound signal and the right-channel input sound signal, and the preceding channel information, which is information indicating which of the left-channel input sound signal and the right-channel input sound signal is preceding (step S185).

As indicated by the dashed line in FIG. 3, when both of the left-right correlation value γ and the preceding channel information are input to the sound signal downmix apparatus 405 from the different apparatus, the left-right relationship information obtaining unit 185 obtains the preceding channel information and the left-right correlation value γ input to the sound signal downmix apparatus 405, and outputs them to the downmix unit 112.

As indicated by the broken line in FIG. 3, in the case where one of the left-right correlation value γ and the preceding channel information is not input to the sound signal downmix apparatus 405 from the different apparatus, the left-right relationship information obtaining unit 185 includes the left-right relationship information estimation unit 183. The left-right relationship information estimation unit 183 of the left-right relationship information obtaining unit 185 obtains the left-right correlation value γ that is not input to the sound signal downmix apparatus 405 or the preceding channel information that is not input to the sound signal downmix apparatus 405 from the left-channel input sound signal and the right-channel input sound signal as with the left-right relationship information estimation unit 183 of the first example, and outputs them to the downmix unit 112. As indicated by the dashed line in FIG. 3, regarding the left-right correlation value γ input to the sound signal downmix apparatus 405 or the preceding channel information input to the sound signal downmix apparatus 405, the left-right relationship information obtaining unit 185 outputs, to the downmix unit 112, the left-right correlation value γ input to the sound signal downmix apparatus 405 or the preceding channel information input to the sound signal downmix apparatus 405.

As indicated by the broken line in FIG. 3, in the case where both of the left-right correlation value γ and the preceding channel information are not input to the sound signal downmix apparatus 405 from the different apparatus, the left-right relationship information obtaining unit 185 includes the left-right relationship information estimation unit 183. The left-right relationship information estimation unit 183 obtains the left-right correlation value γ and the preceding channel information from the left-channel input sound signal and the right-channel input sound signal as with the left-right relationship information estimation unit 183 of the first example, and outputs them to the downmix unit 112. That is, it can be said that the left-right relationship information estimation unit 183 and step S183 of the first example belong to the categories of the left-right relationship information obtaining unit 185 and step S185, respectively.

Second Embodiment

Even in the case where the number of channels is three or more, a monaural signal useful for signal processing such as coding processing can be obtained by setting the same relationship between the downmix signal and the input sound signal of each channel as that of the sound signal downmix apparatuses 401 and 405 of the first embodiment. This configuration will be described as a second embodiment.

The way of including the input sound signal of a certain channel in a downmix signal in the sound signal downmix apparatuses 401 and 405 of the first embodiment will be described below with the channel number of each of the left channel and the right channel set as n. The sound signal downmix apparatuses 401 and 405 of the first embodiment operate such that, for each nth channel, the larger the correlation of the input sound signal of a channel succeeding the nth channel and the input sound signal of the nth channel, the larger the weight of the input sound signal of the nth channel included in the downmix signal, whereas the larger the correlation of the input sound signal of a channel preceding the nth channel and the input sound signal of the nth channel, the smaller the weight of the input sound signal of the nth channel included in the downmix signal. The sound signal downmix apparatus of the second embodiment expands the above-described relationship between the input sound signal and the downmix signal, so as to support the case with a plurality of preceding channels, the case with a plurality of succeeding channels, and the case with both a preceding channel and a succeeding channel. The sound signal downmix apparatus of the second embodiment will be described below. Note that the sound signal downmix apparatus of the second embodiment is an apparatus that expands the sound signal downmix apparatus of the first embodiment so as to support the case where the number of channels is three or more, and operates in the same manner as that of the sound signal downmix apparatus of the first embodiment when the number of channels is two.

In the first embodiment, an example has been described in which the smaller the correlation of the input sound signals between channels, the similar the downmix signal obtained by the sound signal downmix apparatuses 401 and 405 is to a signal obtained by averaging all input sound signals. The above-described relationship between the input sound signal and the downmix signal can be achieved even when the number of channels is three or more, and therefore it is described as an example of the sound signal downmix apparatus of the second embodiment.

First Example

Figure 5:
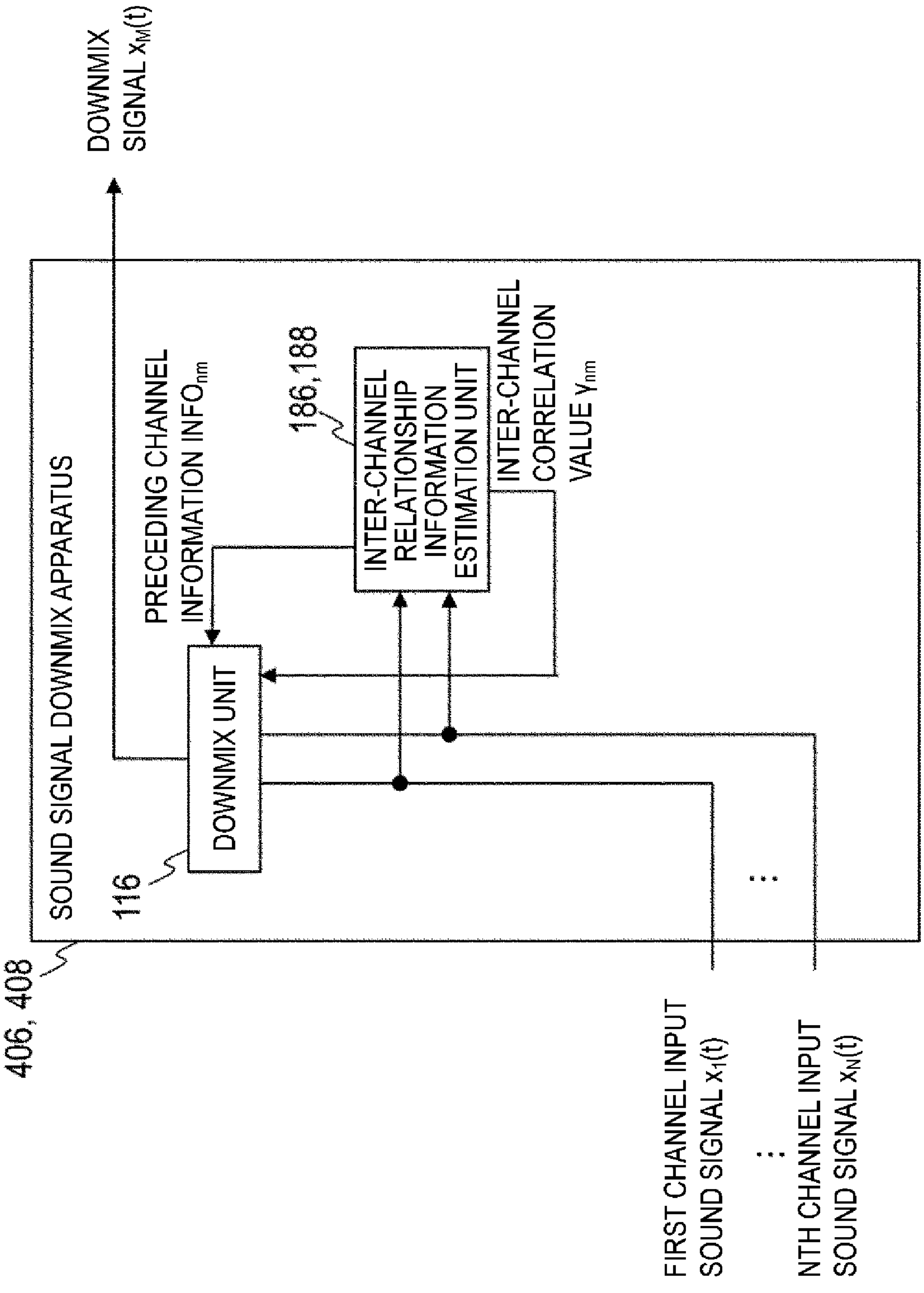
FIG. 5 is a block diagram illustrating an example of a sound signal downmix apparatus of a first example of a second embodiment and a first example of a third embodiment.
Figure 6:
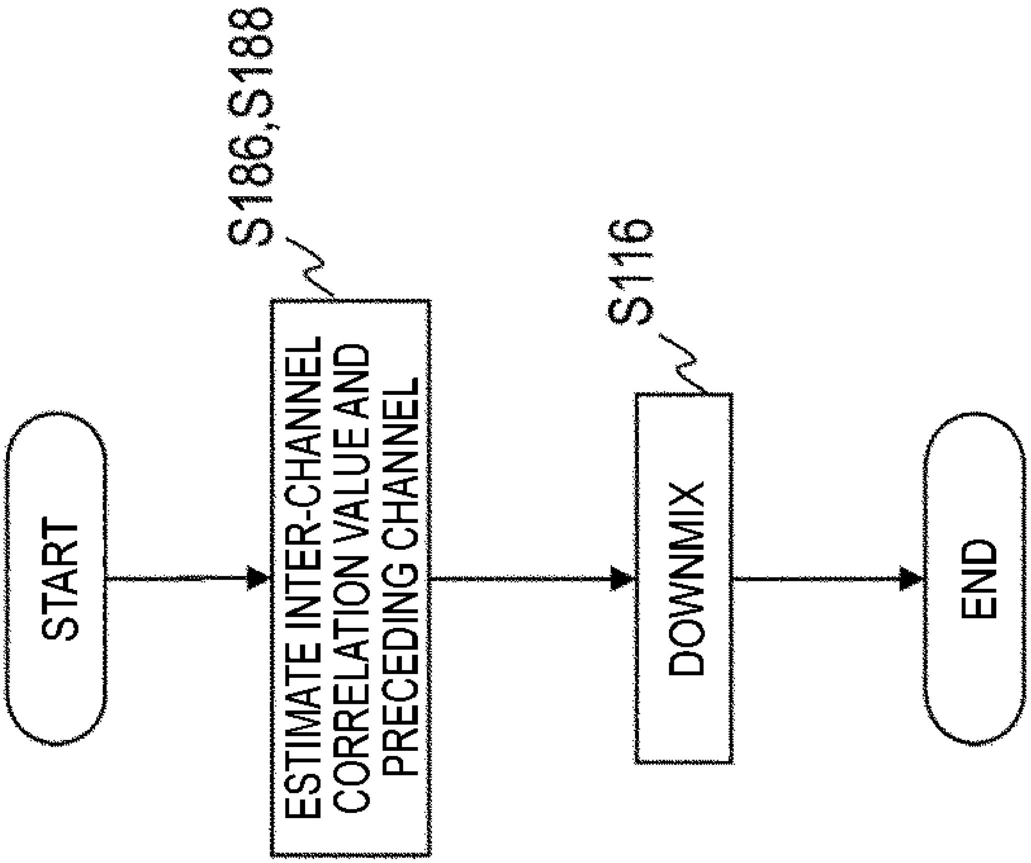
FIG. 6 is a flowchart of an example of processing of the sound signal downmix apparatus of the first example of the second embodiment and the first example of the third embodiment.

First, a sound signal downmix apparatus of a first example of the second embodiment will be described. As illustrated in FIG. 5, a sound signal downmix apparatus 406 of the first example includes an inter-channel relationship information estimation unit 186 and a downmix unit 116. The sound signal downmix apparatus 406 obtains a downmix signal described later from an input time-domain sound signal of N-channel stereo in a frame unit of a predetermined time length of, for example, 20 ms, and outputs the signal. The number of channels N is an integer of 2 or greater. It should be noted that the sound signal downmix apparatus of the second embodiment is especially useful for the case where N is an integer of three or greater because it suffices to use the sound signal downmix apparatus of the first embodiment in the case where the number of channels is two. Time-domain sound signals of the N channels are input to the sound signal downmix apparatus 406. Examples of such signals include a digital sound signal obtained through an AD conversion of a sound such as a voice and music picked up by each of N microphones, digital sound signals of the N channels, which are obtained by performing no processing or appropriately mixing these signals, a digital sound signal of one or more channels picked up at a plurality of points and subjected to an AD conversion, a digital decoded sound signal obtained by coding/decoding the above-described digital sound signals, and a digital signal processed sound signal obtained through signal processing of the above-described digital sound signals. A downmix signal that is a time-domain monaural sound signal obtained by the sound signal downmix apparatus 406 is input to a coding apparatus that performs coding of at least the downmix signal and a signal processing apparatus that performs signal processing of at least the downmix signal. The input sound signals of the N channels are input to the sound signal downmix apparatus 406 in a frame unit, and the sound signal downmix apparatus 406 obtains and outputs the downmix signal in a frame unit. In the following description, the number of samples per frame will be described as T. T is a positive integer, and for example, when the frame length is 20 ms and the sampling frequency is 32 kHz, T is 640. The sound signal downmix apparatus 406 of the first example performs the processing of step S186 and step S116 exemplified in FIG. 6 for each frame.

Inter-Channel Relationship Information Estimation Unit 186

The input sound signals of the N channels input to the sound signal downmix apparatus 406 are input to the inter-channel relationship information estimation unit 186. The inter-channel relationship information estimation unit 186 obtains an inter-channel correlation value and the preceding channel information from the input sound signals of the N channels input thereto and outputs the inter-channel correlation value and the preceding channel information (step S186). The inter-channel correlation value and the preceding channel information are information indicating the relationship between channels for the input sound signals of the N channels, and can be referred to as inter-channel relationship information.

The inter-channel correlation value is a value indicating the degree of the correlation for each pair of two channels included in the N channels in consideration of the time difference between input sound signals. $(N\times(N-1))/2$ pairs of two channels are included in the N channels. In the case where n is an integer from 1 to N, m is an integer greater than n and equal to or smaller than N, and the inter-channel correlation value between the nth channel input sound signal and mth channel input sound signal is $\gamma_{nm}$, the inter-channel relationship information estimation unit 186 obtains the inter-channel correlation value $\gamma_{nm}$ of each of $(N\times(N-1))/2$ pairs of n and m.

The preceding channel information is information, for each pair of two channels included in the N channels, indicating which of the input sound signals of the two channels include the same sound signal first and thus indicating which of the two channels is preceding. In the case where the preceding channel information between the nth channel input sound signal and mth channel input sound signal is referred to as $INFO_{nm}$, the inter-channel relationship information estimation unit 186 obtains the preceding channel information $INFO_{nm}$ of each of the above-described $(N\times(N-1))/2$ pairs of n and m. Note that in the following description, for each pair of n and m, the case where the same sound signal is included in the nth channel input sound signal earlier than the mth channel input sound signal may be referred to as "the nth channel is preceding the mth channel", "the nth channel precedes the mth channel", "the mth channel is succeeding the nth channel", "the mth channel succeeds the nth channel", and the like. Likewise, in the following description, for each pair of n and m, the case where the same sound signal is included in the mth channel input sound signal earlier than the nth channel input sound signal may be referred to as "the mth channel is preceding the nth channel", "the mth channel precedes the nth channel", "the nth channel is succeeding the mth channel", "the nth channel succeeds the mth channel", and the like.

It suffices that the inter-channel relationship information estimation unit 186 obtains the inter-channel correlation value $\gamma_{nm}$ and the preceding channel information $INFO_{nm}$ as with the left-right relationship information estimation unit 183 of the first embodiment for each of the (N×−1))/2 pairs of the nth channel and the mth channel. Specifically, the inter-channel relationship information estimation unit 186 can obtain the inter-channel correlation value $\gamma_{nm}$ and the preceding channel information $INFO_{nm}$ of each pair of the nth channel and the mth channel by performing the same operation as that of each example of the left-right relationship information estimation unit 183 of the first embodiment for each of the (N×(N−1))/2 pairs of the nth channel and the mth channel. Here, in each example of the description of the left-right relationship information estimation unit 183 of the first embodiment, the left channel is read as the nth channel, the right channel is read as the mth channel, L is read as n, R is read as m, the preceding channel information is read as the preceding channel information $INFO_{nm}$, and the left-right correlation value $\gamma$ is read as the inter-channel correlation value $\gamma_{nm}$, for example.

For example, the absolute value of a correlation coefficient is used as a value indicating the degree of the correlation. In such a case, for each candidate number of samples $\tau_{cand}$ from $\tau_{max}$ to $\tau_{min}$ set in advance for each of the (N×(N−1))/2 pairs of the nth channel and the mth channel, the inter-channel relationship information estimation unit 186 obtains and outputs, as an inter-channel correlation coefficient $\gamma_{nm}$, a maximum value of the absolute value $\gamma_{cand}$ of the correlation coefficient between the sample sequence of the nth channel input sound signal and the sample sequence of the mth channel input sound signal shifted backward relative to the sample sequence of the nth channel input sound signal by the candidate number of samples $\tau_{cand}$, obtains and outputs information indicating that the nth channel is preceding as the preceding channel information $INFO_{nm}$ in the case where $\tau_{cand}$ when the absolute value of the correlation coefficient is a maximum value is a positive value, and obtains and outputs information indicating that the mth channel is preceding as the preceding channel information $INFO_{nm}$ in the case where $\tau_{cand}$ when the absolute value of the correlation coefficient is a maximum value is a negative value. In the case where $\tau_{cand}$ when the absolute value of the correlation coefficient is a maximum value is zero, the inter-channel relationship information estimation unit 186 may obtain and output information indicating that the nth channel is preceding as the preceding channel information $INFO_{nm}$, or may obtain and output information indicating that the mth channel is preceding as the preceding channel information $INFO_{nm}$, for each pair of the nth channel and the mth channel. Note that $\tau_{max}$ and $\tau_{min}$ are the same as those of the first embodiment.

In addition, for example, instead of the absolute value of the correlation coefficient, a correlation value using information about a phase of a signal may be set as $\gamma_{cand}$ as follows. In this example, first, the inter-channel relationship information estimation unit 186 obtains the frequency spectrum $X_i(k)$ at each frequency k of 0 to T−1 by performing Fourier transform on input sound signals $x_i(1)$, $x_i(2)$ . . . , $x_i(T)$ as in the following Equation (2-1) for each channel i from the first channel input sound signal to the Nth channel input sound signal.

[Math. 7]

$$X_i(k) = \frac{1}{\sqrt{T}} \sum_{t=0}^{T-1} x_i(t+1) e^{-j\frac{2\pi kt}{T}} \tag{2-1}$$

Next, the inter-channel relationship information estimation unit 186 performs subsequent processing for each of the (N×(N−1))/2 pairs of the nth channel and the mth channel. First, the inter-channel relationship information estimation unit 186 obtains the phase difference spectrum $\varphi(k)$ at each frequency k through the following Equation (2-2) by using the nth channel frequency spectrum $X_n(k)$ and the mth channel frequency spectrum $X_m(k)$ at each frequency k obtained through Equation (2-1).

[Math. 8]

$$\phi(k) = \frac{X_n(k)/|X_n(k)|}{X_m(k)/|X_m(k)|} \tag{2-2}$$

Next, the inter-channel relationship information estimation unit 186 obtains the phase difference signal $\psi(\tau_{cand})$ for each candidate number of samples $\tau_{cand}$ from $\tau_{max}$ to $\tau_{min}$ as in Equation (1-4) by performing inverse Fourier transform on the phase difference spectrum obtained through Equation (2-2). Next, the inter-channel relationship information estimation unit 186 obtains and outputs the maximum value of the correlation value $\gamma_{cand}$ that is the absolute value of the phase difference signal $\psi(\tau_{cand})$ as the inter-channel correlation value $\gamma_{nm}$, obtains and outputs information indicating that the nth channel is preceding as the preceding channel information $INFO_{nm}$ in the case where $\tau_{cand}$ when the correlation value is a maximum value is a positive value, and obtains and outputs information indicating that the mth channel is preceding as the preceding channel information $INFO_{nm}$ in the case where $\tau_{cand}$ when the correlation value is a maximum value is a negative value. In the case where $\tau_{cand}$ when the correlation value is a maximum value is zero, the inter-channel relationship information estimation unit 186 may obtain and output information indicating that the nth channel is preceding as the preceding channel information $INFO_{nm}$, or information indicating that the mth channel is preceding as the preceding channel information $INFO_{nm}$.

Note that instead of using as it is the absolute value of the phase difference signal $\psi(\tau_{cand})$ as the correlation value $\gamma_{cand}$, the inter-channel relationship information estimation unit 186, as with the left-right relationship information estimation unit 183, may use a normalized value such as a relative difference between the average of the absolute values of phase difference signals obtained for a plurality of candidate numbers of samples before and after $\tau_{cand}$ and the absolute value of the phase difference signal $\psi(\tau_{cand})$ for each $\tau_{cand}$, for example. That is, the inter-channel relationship information estimation unit 186 may obtain an average value through Equation (1-5) by using the positive number $\tau_{range}$ set in advance for each $\tau_{cand}$, and use, as $\gamma_{cand}$, a normalized correlation value obtained through Equation (1-6) by using the obtained average value $\psi_c(\tau_{cand})$ and phase difference signal $\psi(\tau_{cand})$.

Downmix Unit 116

The input sound signals of the N channels input to the sound signal downmix apparatus 406, the inter-channel correlation value $\gamma_{nm}$ of each the (N×(N−1))/2 pairs of n and m (that is, the inter-channel correlation value of each pair of two channels included in the N channels) output by the inter-channel relationship information estimation unit 186, and the preceding channel information $INFO_{nm}$ of each of the (N×(N−1))/2 pairs of n and m (that is, the preceding channel information of each pair of two channels included in the N channels) output by the inter-channel relationship information estimation unit 186 are input to the downmix unit 116. The downmix unit 116 weights the input sound signal of each channel such that the larger the correlation with the input sound signal of each channel that precedes the channel, the smaller the weight, whereas the larger the correlation with the input sound signal of each channel that succeeds the channel, the larger the weight, and thus obtains and outputs a downmix signal by weighting and adding the input sound signals of the N channels (step S116).

Specific Example 1 of Downmix Unit 116

A specific example 1 of the downmix unit 116 will be described below with the channel number of each channel (channel index) as i, input sound signals of the ith channel as $x_i(1), x_i(2) \ldots, x_i(T)$, and the downmix signals as $x_M(1), x_M(2) \ldots, x_M(T)$. Assume that in the specific example 1, the inter-channel correlation value is a value from 0 to 1 as with the absolute value of the correlation coefficient and the normalized value in the above-described example of the inter-channel relationship information estimation unit 186. In addition, here, M is not a channel number, but is a subscript indicating that a downmix signal is a monaural signal. The downmix unit 116 obtains a downmix signal by performing the processing of step S116-1 to step S116-3 described below, for example. First, for each ith channel, the downmix unit 116 obtains the set $I_{Li}$ of the channel numbers of the channels preceding the ith channel and the set $I_{Fi}$ of the channel numbers of the channels succeeding the ith channel from the preceding channel information of the (N−1) pairs of two channels including the ith channel of the preceding channel information $INFO_{nm}$ input to the downmix unit 116 (step S116-1). Next, for each ith channel, the downmix unit 116 obtains a weight $w_i$ of the ith channel through the following Equation (2-3) using the inter-channel correlation value of the (N−1) pairs of two channels including the ith channel of the inter-channel correlation value $\gamma_{nm}$ input to the downmix unit 116, the set $I_{Li}$ of the channel numbers of the channels preceding the ith channel, and the set $I_{Fi}$ of the channel numbers of the channels succeeding the ith channel (step S116-2).

[Math. 9]

$$w_i = \frac{1}{N} \prod_{j \in I_{Li}} (1 - \gamma_{ij}) \left(1 + \sum_{k \in I_{Fi}} \gamma_{ik}\right). \tag{2-3}$$

Note that for each pair of n and m described above, the inter-channel correlation value $\gamma_{mn}$ is the same value as the inter-channel correlation value $\gamma_{nm}$, and therefore both an inter-channel correlation value $\gamma_{ij}$ of the case where i is greater than j and an inter-channel correlation value $\gamma_{ik}$ of the case where i is greater than k are included in the inter-channel correlation value $\gamma_{nm}$ input to the downmix unit 116.

Next, the downmix unit 116 obtains the downmix signals $x_M(1), x_M(2) \ldots, x_M(T)$ by obtaining a downmix signal sample $x_M(t)$ through the following Equation (2-4) for each sample number t (sample index t) by using the input sound signals $x_i(1), x_i(2) \ldots, x_i(T)$ of each ith channel whose i is from 1 to N, and the weight $w_i$ of each ith channel whose i is from 1 to N (step S116-3).

[Math 10]

$$x_M(t) = \sum_{i=1}^{N} w_i \times x_i(t) \tag{2-4}$$

Note that the downmix unit 116 may obtain the downmix signal by using an equation in which the weight $w_i$ of Equation (2-4) is replaced with the right side of Equation (2-3) instead of sequentially performing step S116-2 and step S116-3. Specifically, it suffices that the downmix unit 116 obtains each sample $x_M(t)$ of the downmix signal through Equation (2-4) with the set of the channel numbers of the channels preceding each ith channel as $I_{Li}$, the set of the channel numbers of the channels succeeding each ith channel as $I_{Fi}$, the inter-channel correlation value of a pair of each ith channel and each channel j preceding the ith channel as $\gamma_{ij}$, the inter-channel correlation value of a pair of each ith channel and each channel k succeeding the ith channel as $\gamma_{ik}$, and the weight of each ith channel as $w_i$ expressed by Equation (2-3).

Equation (2-4) is an equation for obtaining a downmix signal by weighting and adding the input sound signals of the N channels, and Equation (2-3) is for obtaining the weight $w_i$ of each ith channel given to the input sound signal of each ith channel in the weighted addition. The part of the following Equation (2-3-A) in Equation (2-3) sets the weight such that the larger the correlation between the input sound signal of the ith channel and the input sound signal of each channel preceding the ith channel, the smaller the value of the weight $w_i$, and that the weight $w_i$ is set to a value close to zero when there is at least one channel with a significantly large correlation between the input sound signal of the ith channel and the input sound signal of the preceding channel in the channels preceding the ith channel.

[Math. 11]

$$\prod_{j \in I_{Li}} (1 - \gamma_{ij}) \tag{2-3-4}$$

The part of the following Equation (2-3-B) in Equation (2-3) sets the weight such that the larger the correlation with the input sound signal of each channel succeeding the ith channel, the more the weight $w_i$ has a value greater than 1.

[Math. 12]

$$\left(1 + \sum_{k \in I_{Fi}} \gamma_{ik}\right) \tag{2-3-B}$$

When the input sound signals of all channels are independent, i.e., when there is no correlation among the channels, it is desirable to set the simple additive average of the input sound signals of all the channels as the downmix signal. In view of this, in Equation (2-3), the weight $w_i$ is obtained by multiplying Equation (2-3-A), Equation (2-3-B) and 1/N such that the maximum value of the part of Equation (2-3-A) is 1 and that the minimum value of the part of Equation (2-3-B) is 1. Thus, when all the correlations among channels have small values, the weight $w_i$ of all channels is set to a value close to 1/N.

Specific Example 2 of Downmix Unit 116

Since at step S116-1 of the specific example 1, the sum of all channels of the weight $w_i$ obtained by the downmix unit 116 is not 1 in some situation, the downmix unit 116 may obtain the downmix signal by using a value obtained by normalizing the weight $w_i$ of each ith channel such that the sum of all channels of the weight is 1 instead of the weight $w_i$ of Equation (2-4), or by using a transformed equation of Equation (2-4) including normalization of the weight $w_i$ such that the sum of all channels of the weight is 1. Differences of this example, referred to as a specific example 2 of the downmix unit 116, from the specific example 1 will be described below.

For example, the downmix unit 116 may obtain the downmix signals $x_M(1)$, $x_M(2)$ . . . , $x_M(T)$ by obtaining the weight $w_i$ for each ith channel through Equation (2-3), obtaining a normalized weight $w'_i$ by normalizing the weight $w_i$ for each ith channel such that the sum of all channels is 1 (that is, obtaining the normalized weight $w'_i$ through the following Equation (2-5) for each ith channel), and obtaining the downmix signal sample $x_M(t)$ through the following Equation (2-6) for each sample number t by using the input sound signals $x_i(1)$, $x_i(2)$ . . . , $x_i(T)$ of each ith channel whose i is from 1 to N and the normalized weight $w'_i$.

[Math. 13]

$$w'_i = \frac{w_i}{\sum_{i=1}^{N} w_i} \tag{2-5}$$

[Math. 14]

$$x_M(t) = \sum_{i=1}^{N} w'_i \times x_i(t) \tag{2-6}$$

That is, it suffices that the downmix unit 116 obtains each sample $x_M(t)$ of the downmix signal through Equation (2-6) with the set of the channel numbers of the channels preceding each ith channel as $I_{Li}$, the set of the channel numbers of the channels succeeding each ith channel as $I_{Fi}$, the inter-channel correlation value of a pair of each ith channel and each channel j preceding the ith channel as $\gamma_{ij}$, the inter-channel correlation value of a pair of each ith channel and each channel k succeeding the ith channel as $\gamma_{ik}$, the weight of each ith channel as $w_i$ expressed by Equation (2-3), and the weight normalized for each ith channel as $w'_i$ expressed by Equation (2-5).

Second Example

For example, in the case where an apparatus different from the sound signal downmix apparatus performs the stereo coding processing on the input sound signals of the N channels, or the case where the input sound signals of the N channels are signals obtained through stereo decoding processing at an apparatus different from the sound signal downmix apparatus, any or all of the same inter-channel correlation value $\gamma_{nm}$ and preceding channel information $INFO_{nm}$ as those obtained by the inter-channel relationship information estimation unit 186 may possibly be obtained by the apparatus different from the sound signal downmix apparatus. It suffices that in the case where any or all of the inter-channel correlation value $\gamma_{nm}$ and the preceding channel information $INFO_{nm}$ are obtained by the different apparatus, any or all of the inter-channel correlation value $\gamma_{nm}$ and the preceding channel information $INFO_{nm}$ obtained by the different apparatus are input to the sound signal downmix apparatus, and the inter-channel relationship information estimation unit 186 obtains the inter-channel correlation value $\gamma_{nm}$ and/or the preceding channel information $INFO_{nm}$ that has not been input to the sound signal downmix apparatus. Hereinafter, differences of a second example from the first example will be mainly described. The second example is an example of a sound signal downmix apparatus on the assumption that any or all of the inter-channel correlation value $\gamma_{nm}$ and the preceding channel information $INFO_{nm}$ are input from the outside.

Figure 7:
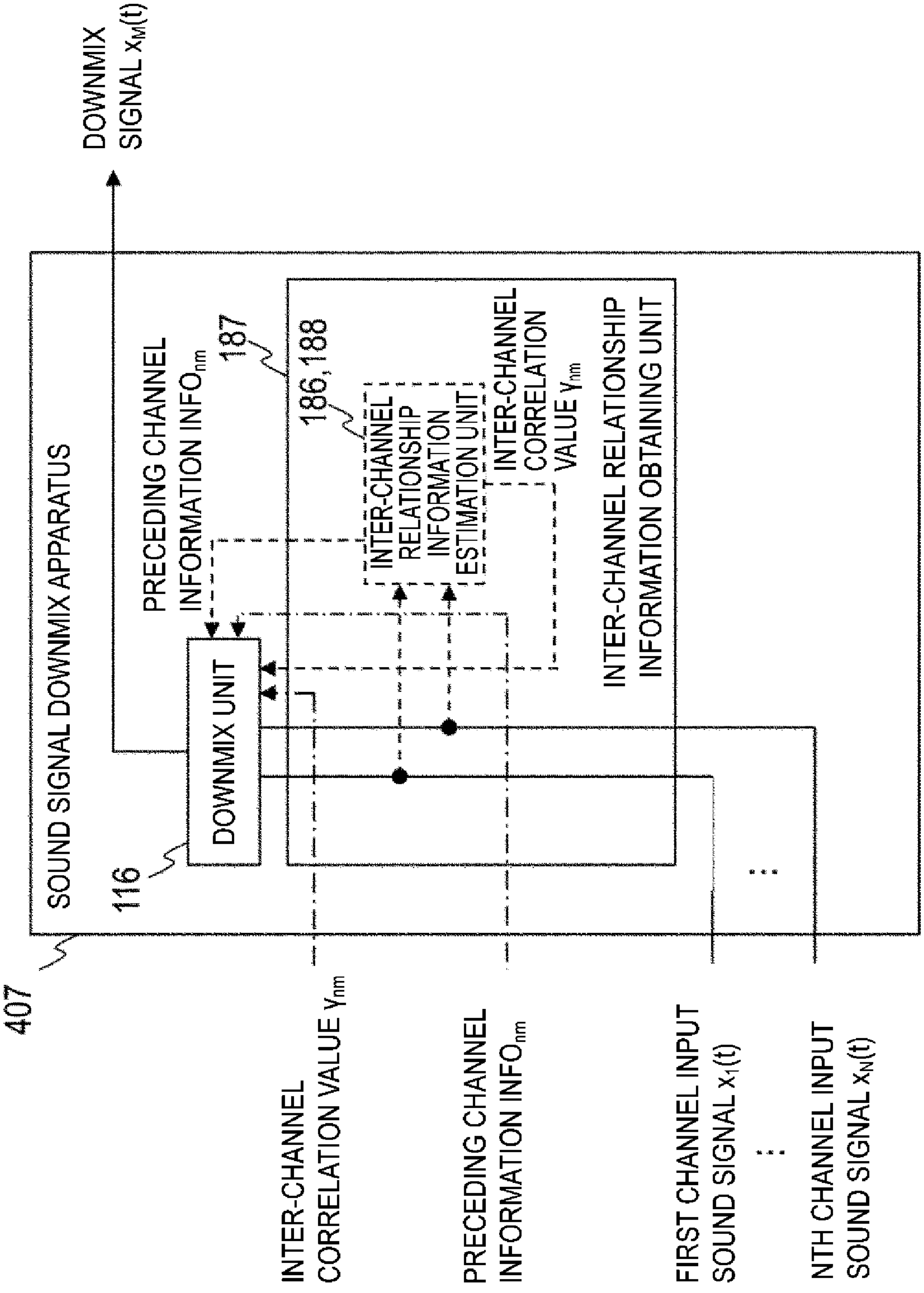
FIG. 7 is a block diagram illustrating an example of a sound signal downmix apparatus of a second example of the second embodiment and a second example of the third embodiment.
Figure 8:
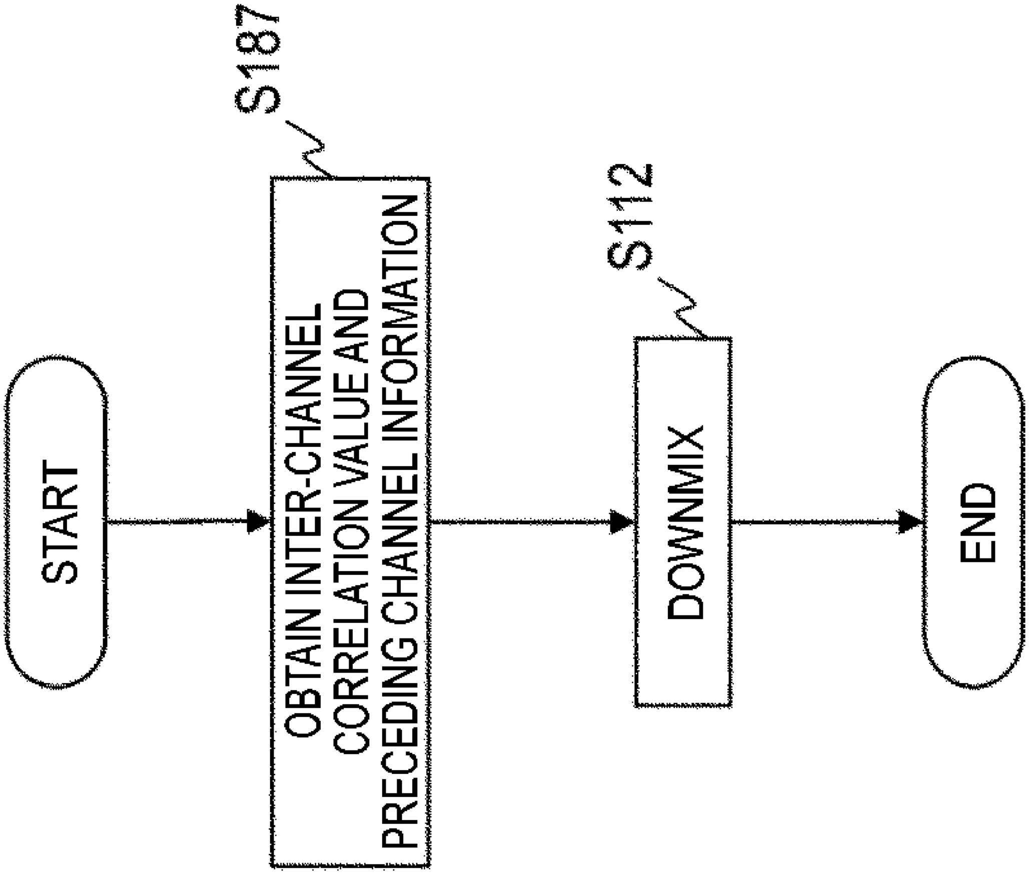
FIG. 8 is a flowchart of an example of processing of the sound signal downmix apparatus of the second example of the second embodiment and the second example of the third embodiment.

As illustrated in FIG. 7, a sound signal downmix apparatus 407 of the second example includes an inter-channel relationship information obtaining unit 187 and the downmix unit 116. As indicated by the dashed line in FIG. 7, in addition to the input sound signals of the N channels, any or all of the inter-channel correlation value $\gamma_{nm}$ and the preceding channel information $INFO_{nm}$ obtained by a different apparatus may be input to the sound signal downmix apparatus 407. The sound signal downmix apparatus 407 of the second example performs the processing of step S187 and step S116 exemplified in FIG. 8 for each frame. The downmix unit 116 and step S116 are identical to those of the first example, and therefore the inter-channel relationship information obtaining unit 187 and step S187 will be described below.

Inter-Channel Relationship Information Obtaining Unit 187

The inter-channel relationship information obtaining unit 187 obtains and outputs the inter-channel correlation value $\gamma_{nm}$, which is a value indicating the degree of the correlation of each pair of two channels included in the N channels, and the preceding channel information $INFO_{nm}$, which is information indicating which of the input sound signals of two channels includes the same sound signal first, for each pair of two channels included in the N channels (step S187).

As indicated by the dashed line in FIG. 7, in the case where all of the inter-channel correlation value $\gamma_{nm}$ and the preceding channel information $INFO_{nm}$ are input from the different apparatus to the sound signal downmix apparatus 407, the inter-channel relationship information obtaining unit 187 obtains the inter-channel correlation value $\gamma_{nm}$ and the preceding channel information $INFO_{nm}$ input to the sound signal downmix apparatus 407, and outputs them to the downmix unit 116.

As indicated by the broken line in FIG. 7, in the case where one of the inter-channel correlation value $\gamma_{nm}$ and the preceding channel information $INFO_{nm}$ is not input to the sound signal downmix apparatus 407 from the different apparatus, the inter-channel relationship information obtaining unit 187 includes the inter-channel relationship information estimation unit 186. The inter-channel relationship information estimation unit 186 of the inter-channel relationship information obtaining unit 187, as with the inter-channel relationship information estimation unit 186 of the first example, obtains the inter-channel correlation value $\gamma_{nm}$ that is not input to the sound signal downmix apparatus 407 or the preceding channel information $INFO_{nm}$ that is not input to the sound signal downmix apparatus 407 from the input sound signals of the N channels, and outputs it to the downmix unit 116. As indicated by the dashed line in FIG. 7, regarding the inter-channel correlation value $\gamma_{nm}$ input to the sound signal downmix apparatus 407 or the preceding channel information $INFO_{nm}$ input to the sound signal downmix apparatus 407, the inter-channel relationship information obtaining unit 187 outputs, to the downmix unit 116, the inter-channel correlation value $\gamma_{nm}$ input to the sound signal downmix apparatus 407 or the preceding channel information $INFO_{nm}$ input to the sound signal downmix apparatus 407.

As indicated by the broken line in FIG. 7, in the case where all of the inter-channel correlation value $\gamma_{nm}$ and the preceding channel information $INFO_{nm}$ are not input to the sound signal downmix apparatus 407 from the different apparatus, the inter-channel relationship information obtaining unit 187 includes the inter-channel relationship information estimation unit 186. The inter-channel relationship information estimation unit 186, as with the inter-channel relationship information estimation unit 186 of the first example, obtains the inter-channel correlation value $\gamma_{nm}$ and the preceding channel information $INFO_{nm}$ from the input sound signals of the N channels, and outputs them to the downmix unit 116. That is, it can be said that the inter-channel relationship information estimation unit 186 and step S186 of the first example belong to the categories of the inter-channel relationship information obtaining unit 187 and step S187, respectively.

Note that there may be a case where a part of the inter-channel correlation value $\gamma_{nm}$ is obtained by the different apparatus while the remaining part of the inter-channel correlation value $\gamma_{nm}$ is not obtained by the different apparatus, a case where a part of the preceding channel information $INFO_{nm}$ is obtained by the different apparatus while the remaining part of the preceding channel information $INFO_{nm}$ is not obtained by the different apparatus, and the like. In such cases, it suffices to include the inter-channel relationship information estimation unit 186 in the inter-channel relationship information obtaining unit 187 such that, as described above, the inter-channel relationship information obtaining unit 187 outputs one obtained by the different apparatus and input to the sound signal downmix apparatus 407 to the downmix unit 116, and that the inter-channel relationship information estimation unit 186 obtains, from the input sound signals of the N channels, one that is not obtained by the different apparatus and not input to the sound signal downmix apparatus 407, and outputs it to the downmix unit 116, as with the inter-channel relationship information estimation unit 186 of the first example.

Third Embodiment

The inter-channel relationship information estimation unit 186 of the second embodiment obtains the inter-channel correlation value $\gamma_{nm}$ and the preceding channel information $INFO_{nm}$ for each pair of two channels included in the N channels. There are $(N\times(N-1))/2$ pairs of two channels included in the N channels, and as such, in the case where the inter-channel correlation value $\gamma_{nm}$ and the preceding channel information $INFO_{nm}$ are obtained by the method exemplified in the description of the inter-channel relationship information estimation unit 186 of the second embodiment, the amount of arithmetic processing can become an issue when the number of channels is large. The third embodiment describes a sound signal downmix apparatus performing inter-channel relationship information estimation processing of obtaining the inter-channel correlation value $\gamma_{nm}$ and the preceding channel information $INFO_{nm}$ in an approximate manner by a method with a smaller amount of arithmetic processing than the inter-channel relationship information estimation unit 186. The downmix processing of the third embodiment is the same as that of the second embodiment.

The downmix processing performed by the downmix unit 116 of the second embodiment is processing in which, for example, when only the same sound output by a certain sound source with a given time difference is included in each of signals of a plurality of channels, one of the input sound signals of the plurality of channels including the same sound output at the earliest timing is included in the downmix signal. This processing will be described with an example in which input sound signals of six channels from a first channel (1*ch*) to a sixth channel (6*ch*) are those schematically illustrated in FIG. 9. In this example, the first channel input sound signal and the second channel input sound signal are signals including only the same first sound signal output by the first sound source with a given time difference, and the first sound signal is included in the second channel input sound signal at the earliest timing. In this example, further, the third channel input sound signal to the sixth channel input sound signal are signals including the same second sound signal output by the second sound source with a given time difference, and the second sound signal is included in the sixth channel input sound signal at the earliest timing. In this example, the downmix unit 116 obtains a downmix signal that includes the second channel input sound signal in which the first sound signal is included at the earliest timing and the sixth channel input sound signal in which the second sound signal is included at the earliest timing, but does not include the first channel input sound signal and the third channel input sound signal to the fifth channel input sound signal. When such a downmix signal is to be obtained, no problem arises even when the inter-channel correlation values $\gamma_{nm}$ of non-adjacent channels are obtained by the following equations in an approximate manner using the inter-channel correlation values of adjacent channels, $\gamma_{12}=1$, $\gamma_{23}=0$, $\gamma_{34}=1$, $\gamma_{45}=1$, and $\gamma_{56}=1$, with each inter-channel correlation value set to a value from 0 to 1.

$$\gamma_{13}=\gamma_{12}\times\gamma_{23}=1\times0=0$$

$$\gamma_{14}=\gamma_{12}\times\gamma_{23}\times\gamma_{34}=1\times0\times1=0$$

$$\gamma_{15}=\gamma_{12}\times\gamma_{23}\times\gamma_{34}\times\gamma_{45}=1\times0\times1\times1=0$$

$$\gamma_{16}=\gamma_{12}\times\gamma_{23}\times\gamma_{34}\times\gamma_{45}\times\gamma_{56}=1\times0\times1\times1\times1=0$$

$$\gamma_{24}=\gamma_{23}\times\gamma_{34}=0\times1=0$$

$$\gamma_{25}=\gamma_{23}\times\gamma_{34}\times\gamma_{45}=0\times1\times1=0$$

$$\gamma_{26}=\gamma_{23}\times\gamma_{34}\times\gamma_{45}\times\gamma_{56}=0\times1\times1\times1=0$$

$$\gamma_{35}=\gamma_{34}\times\gamma_{45}=1\times1=1$$

$$\gamma_{36}=\gamma_{34}\times\gamma_{45}\times\gamma_{56}=1\times1\times1=1$$

$$\gamma_{46}=\gamma_{45}\times\gamma_{56}=1\times1=1$$

Likewise, no problem arises even when the time differences of non-adjacent channels are obtained by the following equations in an approximate manner using time differences $\tau_{12}$, $\tau_{23}$, $\tau_{34}$, $\tau_{45}$, and $\tau_{56}$ of the adjacent channels, and the preceding channel information $INFO_{nm}$ is obtained in an approximate manner based on whether each obtained time difference between channels is positive, negative, or zero.

$$\tau_{13}=\tau_{12}+\tau_{23}$$

$$\tau_{14}=\tau_{12}+\tau_{23}+\tau_{34}$$

$$\tau_{15}=\tau_{12}+\tau_{23}+\tau_{34}+\tau_{45}$$

$$\tau_{16}=\tau_{12}+\tau_{23}+\tau_{34}+\tau_{45}+\tau_{56}$$

$$\tau_{24}=\tau_{23}+\tau_{34}$$

$$\tau_{25}=\tau_{23}+\tau_{34}+\tau_{45}$$

$$\tau_{26}=\tau_{23}+\tau_{34}+\tau_{45}+\tau_{56}$$

$$\tau_{35}=\tau_{34}+\tau_{45}$$

$$\tau_{36}=\tau_{34}+\tau_{45}+\tau_{56}$$

$$\tau_{46}=\tau_{45}+\tau_{56}$$

Figure 9:
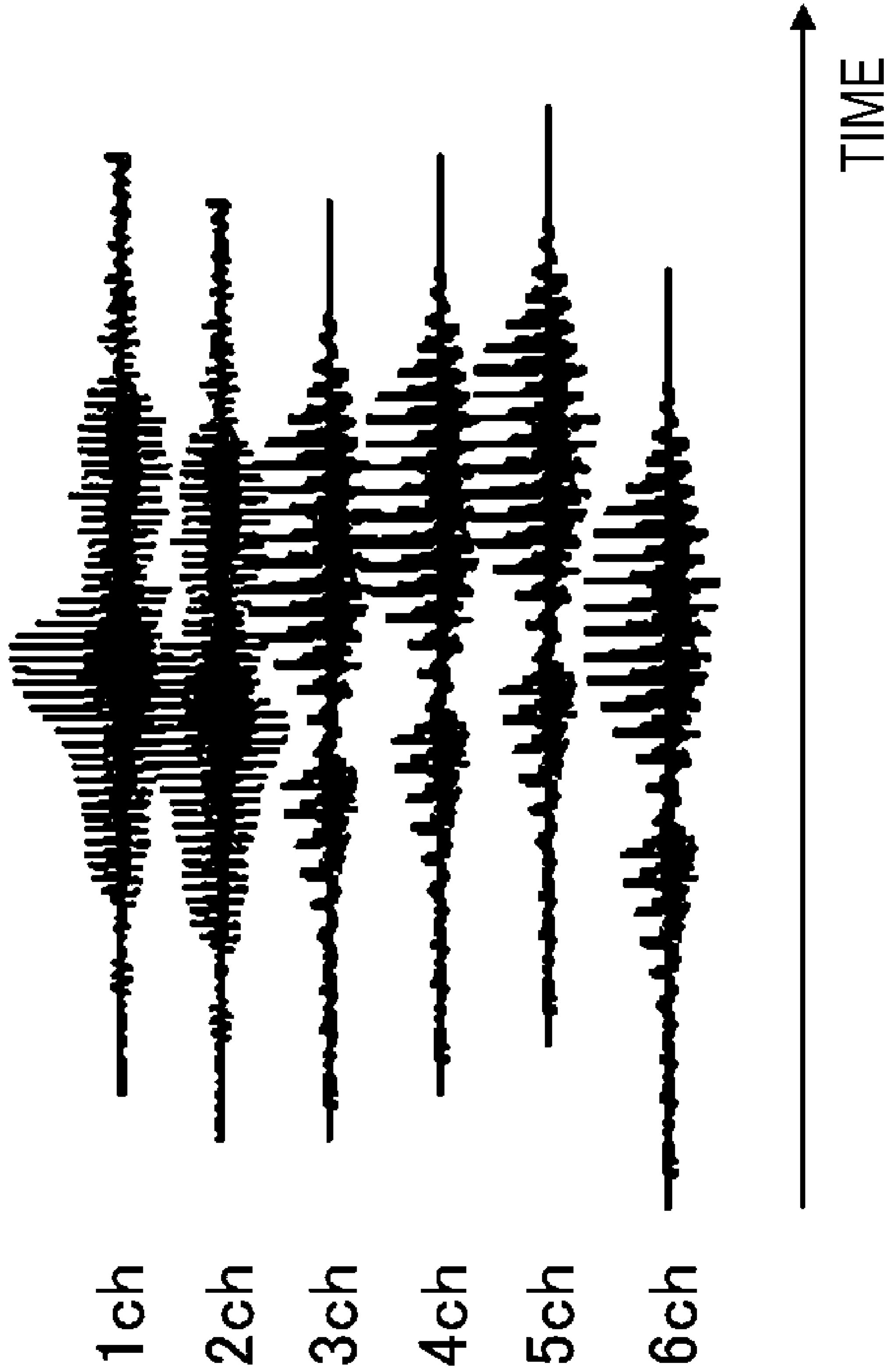
FIG. 9 is a diagram schematically illustrating a 6-channel input sound signal input to a sound signal downmix apparatus.
Figure 10:
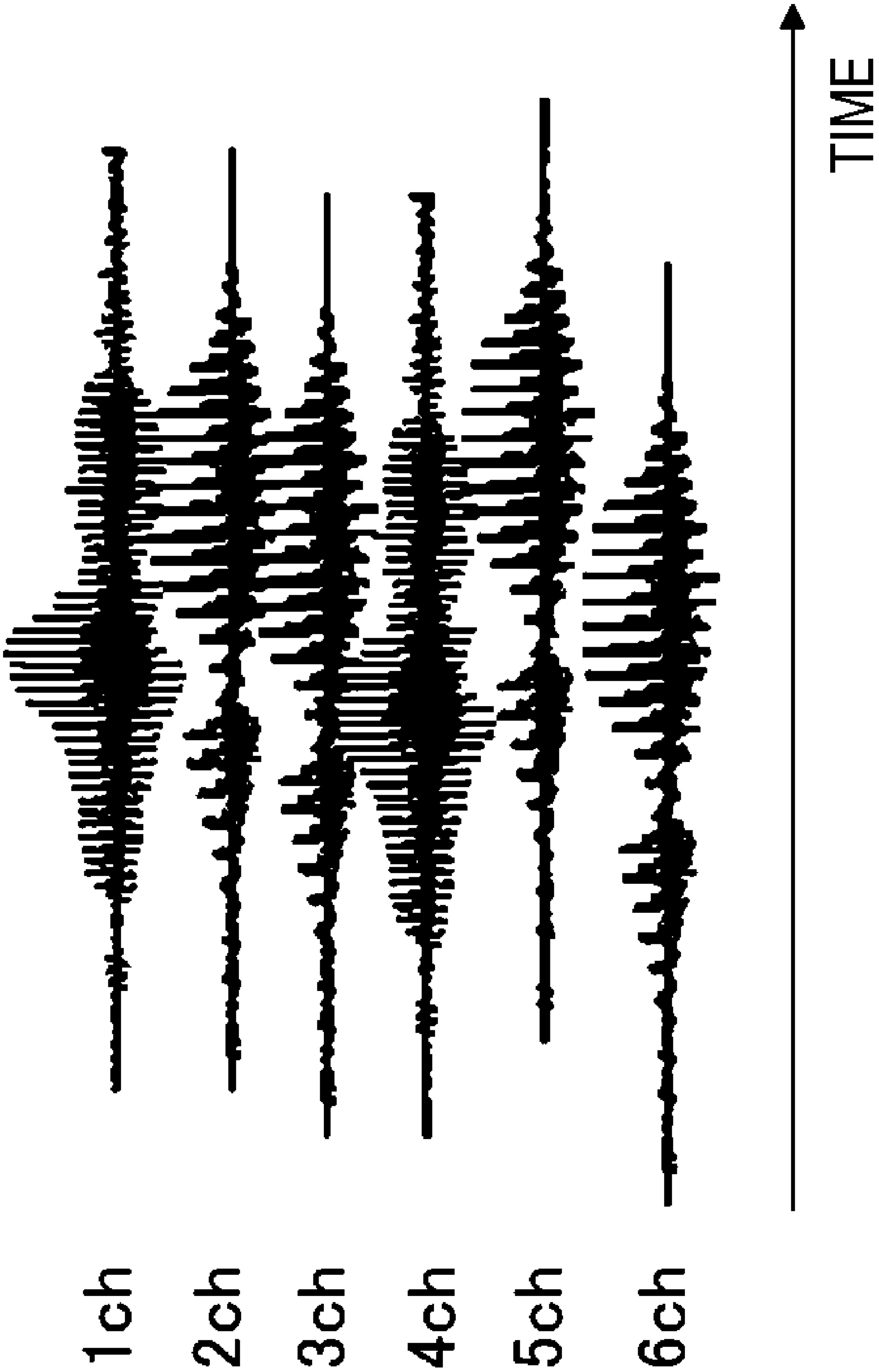
FIG. 10 is a diagram schematically illustrating a 6-channel input sound signal input to a sound signal downmix apparatus.

It should be noted that the inter-channel correlation value $\gamma_{nm}$ and the preceding channel information $INFO_{nm}$ can be obtained using the above-mentioned equations in an approximate manner only in the case where the input sound signals with the same or similar waveforms are located at successive channels as exemplified in FIG. 9, and in the case where there is a channel with an input sound signal with a significantly different waveform between channels of the input sound signals with the same or similar waveforms as exemplified in FIG. 10, the inter-channel correlation value $\gamma_{nm}$ and the preceding channel information $INFO_{nm}$ cannot be obtained in an approximate manner using the above-mentioned equations. In view of this, the sound signal downmix apparatus of the third embodiment sorts the input sound signals of the N channels such that there is no channel with a significantly different waveform of the input sound signal between the channels with the same or similar waveforms of the input sound signals, obtains the inter-channel correlation value $\gamma_{nm}$ and the preceding channel information $INFO_{nm}$ for adjacent channels after the sorting, and obtains other inter-channel correlation values $\gamma_{nm}$ and preceding channel information $INFO_{nm}$ in an approximate manner by using the inter-channel correlation value $\gamma_{nm}$ and the preceding channel information $INFO_{nm}$ between the adjacent channels after the sorting.

First Example

A sound signal downmix apparatus of a first example of the third embodiment is described below. As illustrated in FIG. 5, a sound signal downmix apparatus 408 of the first example includes an inter-channel relationship information estimation unit 188 and the downmix unit 116. The sound signal downmix apparatus 408 of the first example performs processing of step S188 and step S116 exemplified in FIG. 6 for each frame. The downmix unit 116 and step S116 are identical to those of the first example of the second embodiment, and therefore the inter-channel relationship information estimation unit 188 and step S188 different from the first example of the second embodiment will be described below. Time-domain sound signals of the N channels are input to the sound signal downmix apparatus 408 as with the sound signal downmix apparatus 408 of the first example of the second embodiment, and a downmix signal that is a time-domain monaural sound signal is obtained and output by the sound signal downmix apparatus 408 as with the sound signal downmix apparatus 406 of the first example of the second embodiment.

Inter-Channel Relationship Information Estimation Unit 188

Figure 11:
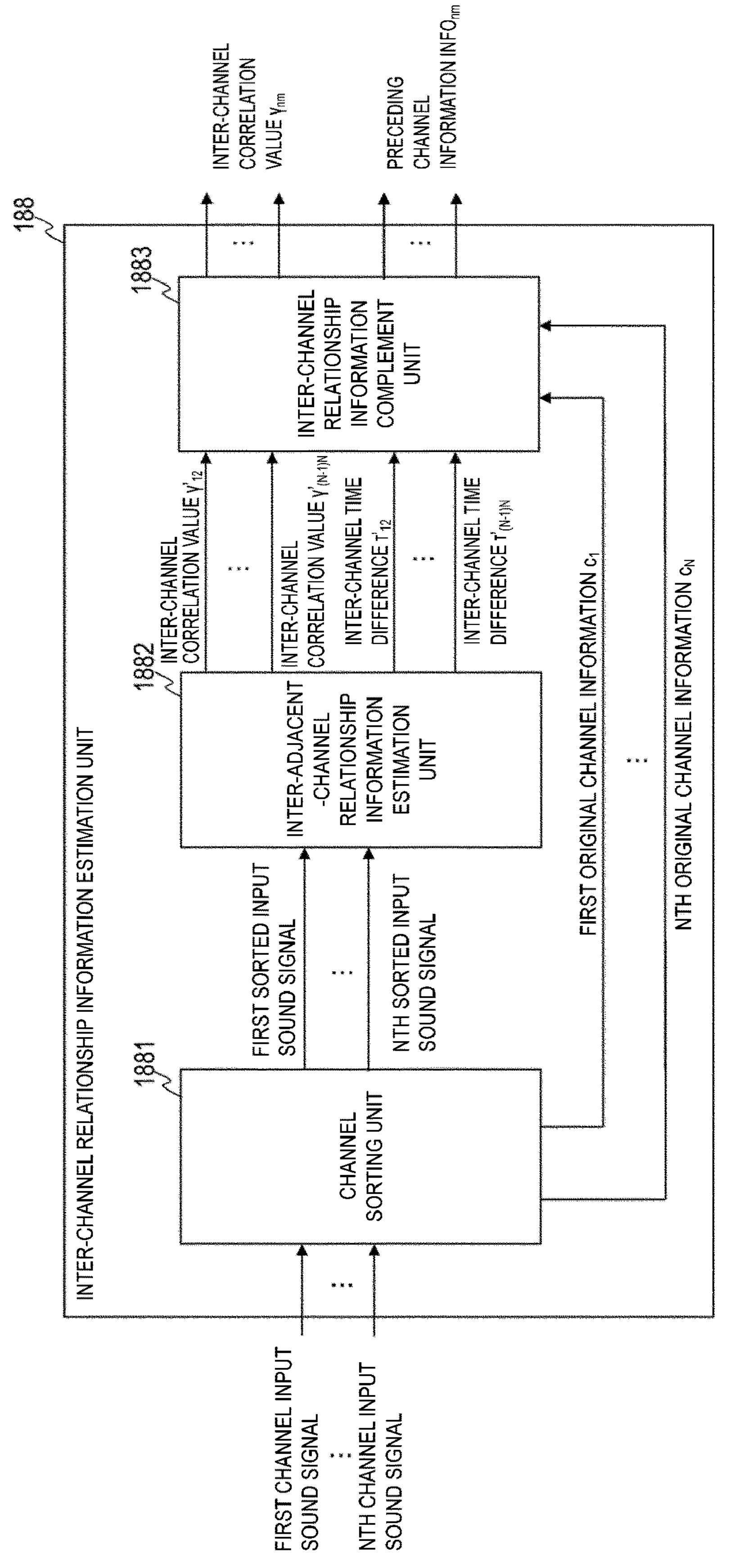
FIG. 11 is a block diagram illustrating an example of an inter-channel relationship information estimation unit of the third embodiment.
Figure 12:
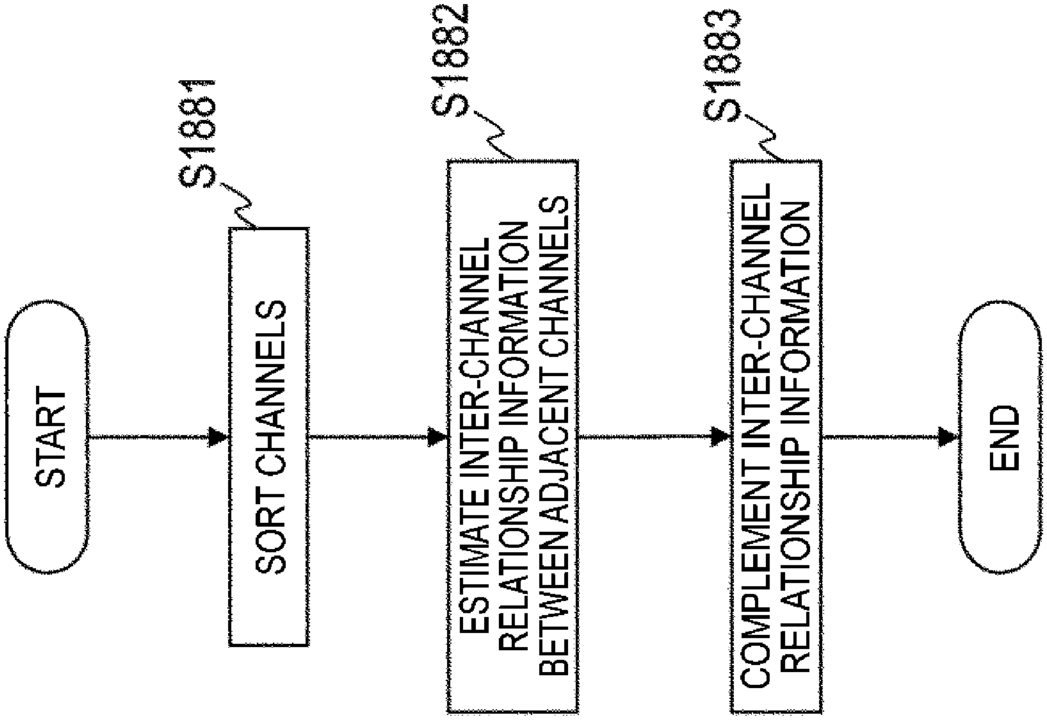
FIG. 12 is a flowchart of an example of processing of the inter-channel relationship information estimation unit of the third embodiment.

The input sound signals of the N channels input to the sound signal downmix apparatus 408 are input to the inter-channel relationship information estimation unit 188. While the number of channels N is an integer of 2 or greater in the second embodiment, the number of channels N is an integer of three or greater in the third embodiment because no channel with a significantly different waveform of the input sound signal can be present between the channels with the same or similar waveforms of the input sound signal when the number of channel N is two. As illustrated in FIG. 11, the inter-channel relationship information estimation unit 188 includes a channel sorting unit 1881, an inter-adjacent-channel relationship information estimation unit 1882, and an inter-channel relationship information complement unit 1883, for example. The inter-channel relationship information estimation unit 188 performs processing of step S1881, step S1882 and step S1883 exemplified in FIG. 12 for each frame, for example (step S188).

Channel Sorting Unit 1881

The channel sorting unit 1881 sequentially performs sorting in the order from the first channel such that the adjacent channel is the channel with highest similarity of the waveform of the input sound signal among the remaining channels when the time differences are aligned, and obtains and outputs a first sorted input sound signal to an Nth sorted input sound signal, which are signals after the sorting of the N channels, and first original channel information $c_1$ to Nth original channel information $c_N$, which are the channel numbers (that is, the channel numbers of the input sound signals) when each input sound signal to be sorted has been input to the sound signal downmix apparatus 408, for example (step S1881A). As the similarity in waveform after the aligning of the time differences, it suffices that the channel sorting unit 1881 uses a value indicating the degree of the correlation such as a value indicating the closeness of the distance between the input sound signals of two channels after the aligning of the time differences, and a value obtained by dividing the inner product of the input sound signals of the two channels after the aligning of the time differences by the geometric mean of the energy of the input sound signals of two channels.

For example, when a value indicating the closeness of the distance between the input sound signals of two channels after the aligning of the time differences is used as the similarity in waveform after the aligning of the time differences, the channel sorting unit 1881 performs the following step S1881A-1 to step S1881A-N. First, the channel sorting unit 1881 obtains the first channel input sound signal as the first sorted input sound signal, and obtains "1" that is the channel number of the first channel as the first original channel information $c_1$ (step S1881A-1).

Next, for each candidate number of samples $\tau_{cand}$ from $\tau_{max}$ to $\tau_{min}$ set in advance (for example, $\tau_{max}$ is a positive number and $\tau_{min}$ is a negative number) for each channel m from the second channel to the Nth channel, the channel sorting unit 1881 obtains the distance between the sample sequence of the first sorted input sound signal and the sample sequence of the mth channel input sound signal shifted backward relative to the sample sequence of the first sorted input sound signal by the candidate number of samples $\tau_{cand}$, obtains the input sound signal of the channel m with the minimum distance value as a second sorted input sound signal, and obtains the channel number of the channel m with the minimum distance value as second original channel information $c_2$ (step S1881A-2).

Next, for each candidate number of samples $\tau_{cand}$ from $\tau_{max}$ to $\tau_{min}$ for each channel m that has not been set as a sorted input sound signal among channels from the second channel to the Nth channel, the channel sorting unit 1881 obtains the distance between the sample sequence of the second sorted input sound signal and the sample sequence of the mth channel input sound signal shifted backward relative to the sample sequence of the second sorted input sound signal by the candidate number of samples $\tau_{cand}$, and obtains the input sound signal of the channel m with a minimum distance value as a third sorted input sound signal, and obtains the channel number of the channel m with the minimum distance value as third original channel information $c_3$ (step S1881A-3). Thereafter, the same processing is repeated until there is only one channel that has not been set as a sorted input sound signal left, so that a fourth sorted input sound signal to a (N−1)th sorted input sound signal, and fourth original channel information $c_4$ to (N−1)th original channel information $c_{(N-1)}$ are obtained (step S1881A-4 step S1881A-(N−1)).

Finally, the channel sorting unit 1881 obtains the input sound signal of the remaining one channel that has not been set as a sorted input sound signal as the Nth sorted input sound signal, and obtains the channel number of the remaining one channel that has not been set as a sorted input sound signal as the Nth original channel information $c_N$ (step S1881A-N). Note that in the following description, the nth sorted input sound signal for each n from 1 to N is referred to also as the input sound signal of the nth channel after the sorting, and the n of the nth sorted input sound signal is referred to also as the channel number after the sorting.

Note that the channel sorting unit 1881 may perform the sorting by evaluating the similarity without aligning the time differences, considering that the purpose is to sort the input sound signals of the N channels such that there is no channel with a significantly different waveform of the input sound signal between the channels with the same or similar waveforms of the input sound signals, and that it is preferable that the amount of arithmetic processing for the sorting processing be small. For example, the channel sorting unit 1881 may perform the following step S1881B-1 to step S1881B-N. First, the channel sorting unit 1881 obtains the first channel input sound signal as the first sorted input sound signal, and obtains "1" that is the channel number of the first channel as the first original channel information $c_1$ (step S1881B-1).

Next, the channel sorting unit 1881 obtains the distance between the sample sequence of the first sorted input sound signal and the sample sequence of the mth channel input sound signal for each channel m from the second channel to the Nth channel, obtains the input sound signal of the channel m with a minimum distance value as the second sorted input sound signal, and obtains the channel number of the channel m with a minimum distance value as the second original channel information $c_2$ (step S1881B-2).

Next, for each channel m that has not been set as a sorted input sound signal among channels from the second channel to the Nth channel, the channel sorting unit 1881 obtains the distance between the sample sequence of the second sorted input sound signal and the sample sequence of the mth channel input sound signal, obtains the input sound signal of the channel m with a minimum distance value as the third sorted input sound signal, and obtains the channel number of the channel m with a minimum distance value as the third original channel information $c_3$ (step S1881B-3). Thereafter, the same processing is repeated until there is only one channel that has not been set as a sorted input sound signal left, so that the fourth sorted input sound signal to the (N−1)th sorted input sound signal, and the fourth original channel information $c_4$ to the (N−1)th original channel information $c_{(N-1)}$ are obtained (step S1881B-4 step S1881B-(N−1)).

Finally, the channel sorting unit 1881 obtains the input sound signal of the remaining one channel that has not been set as a sorted input sound signal as the Nth sorted input sound signal, and obtains the channel number of the remaining one channel that has not been set as a sorted input sound signal as the Nth original channel information $c_N$ (step S1881B-N).

In short, it suffices that regardless of whether or not the time differences are aligned or regardless of the value to be used as the similarity of the signals, the channel sorting unit 1881 sequentially performs the sorting in the order from the first channel such that the adjacent channel is the channel with the most similar input sound signal among the remaining channels, and obtains and outputs the first sorted input sound signal to the Nth sorted input sound signal as the signals after the sorting of the N channels, and the first original channel information $c_1$ to the Nth original channel information $c_N$ as the channel numbers (that is, the channel numbers of the input sound signals) when each sorted input sound signal is input to the sound signal downmix apparatus 408 (step S1881).

Inter-Adjacent-Channel Relationship Information Estimation Unit 1882

The N sorted input sound signals from the first sorted input sound signal to the Nth sorted input sound signal are input to the inter-adjacent-channel relationship information estimation unit 1882. The inter-adjacent-channel relationship information estimation unit 1882 obtains and outputs the inter-channel correlation value and the inter-channel time difference of each pair of two channels after the sorting with adjacent channel numbers after the sorting in the N sorted input sound signals (step S1882).

The inter-channel correlation value obtained at step S1882 is a correlation value that takes into account the time difference between the sorted input sound signals for each pair of two channels after the sorting with adjacent channel numbers after the sorting, that is, a value indicating the degree of the correlation that takes into account the time difference between the sorted input sound signals. There are (N−1) pairs of two channels included in the N channels. In the case where n is an integer from 1 to N−1, and the inter-channel correlation value between the nth sorted input sound signal and the (n+1)th sorted channel input sound signal is $\gamma'_{n(n+1)}$, the inter-adjacent-channel relationship information estimation unit 1882 obtains the inter-channel correlation value $\gamma'_{n(n+1)}$ for each of (N−1) pairs of two channels after the sorting with adjacent channel numbers after the sorting.

The inter-channel time difference obtained at step S1882 is information indicating which of two sorted input sound signals includes the same sound signal and how much earlier the same sound signal is included for each pair of two channels after the sorting with adjacent channel numbers after the sorting. In the case where the inter-channel time difference between the nth sorted input sound signal and the (n+1)th sorted input sound signal is $\tau'_{n(n+1)}$, the inter-adjacent-channel relationship information estimation unit 1882 obtains the inter-channel time difference $\tau'_{n(n+1)}$ for each of (N−1) pairs of two channels after the sorting with adjacent channel numbers after the sorting.

For example, the absolute value of a correlation coefficient is used as a value indicating the degree of the correlation. In such a case, for each candidate number of samples $\tau_{cand}$ from $\tau_{max}$ to $\tau_{min}$ set in advance for each n from 1 to N−1 (that is, for each pair of two channels after the sorting with adjacent channel numbers after the sorting), the inter-adjacent-channel relationship information estimation unit 1882 obtains and outputs, as the inter-channel correlation value $\gamma'_{n(n+1)}$, the maximum value of the absolute value $\gamma_{cand}$ of the correlation coefficient between the sample sequence of the nth sorted input sound signal and the sample sequence of the (n+1)th sorted input sound signal shifted backward relative to the sample sequence of the nth sorted input sound signal by the candidate number of samples $\tau_{cand}$, and obtains and outputs, as the inter-channel time difference $\tau'_{n(n+1)}$, $\tau_{cand}$ when the absolute value of the correlation coefficient is a maximum value.

In addition, for example, instead of the absolute value of the correlation coefficient, a correlation value using information about a phase of a signal may be set as $\gamma_{cand}$ as follows. In this example, first, for each channel i from the first channel input sound signal to the Nth channel input sound signal, the inter-adjacent-channel relationship information estimation unit 1882 obtains the frequency spectrum $X_i(k)$ at each frequency k of 0 to T−1 by performing Fourier transform on the input sound signals $x_i(1)$, $x_i(2)$ . . . , $x_i(T)$ as in Equation (2-1).

Next, the inter-adjacent-channel relationship information estimation unit 1882 performs the following processing for each n from 1 to N−1, that is, each pair of two channels after the sorting with adjacent channel numbers after the sorting. First, the inter-adjacent-channel relationship information estimation unit 1882 obtains the phase difference spectrum φ(k) at each frequency k through the following Equation (3-1) by using the frequency spectrum $X_n(k)$ of the nth channel and the frequency spectrum $X_{(n+1)}(k)$ of the (n+1)th channel at each frequency k obtained through Equation (2-1).

[Math. 15]

$$\phi(k) = \frac{X_n(k)/|X_n(k)|}{X_{(n+1)}(k)/|X_{(n+1)}(k)|} \tag{3-1}$$

Next, the inter-adjacent-channel relationship information estimation unit 1882 obtains the phase difference signal $\psi(\tau_{cand})$ for each candidate number of samples $\tau_{cand}$ from $\tau_{max}$ to $\tau_{min}$ as in Equation (1-4) by performing inverse Fourier transform on the phase difference spectrum obtained through Equation (3-1). Next, the inter-adjacent-channel relationship information estimation unit 1882 obtains and outputs, as the inter-channel correlation value $\gamma_{n(n+1)}$, the maximum value of the correlation value $\gamma_{cand}$ that is the absolute value of the phase difference signal $\psi(\tau_{cand})$, and obtains and outputs, as the inter-channel time difference $\tau'_{n(n+1)}$, $\tau_{cand}$ when the correlation value is a maximum value.

Note that instead of using as it is the absolute value of the phase difference signal $\psi(\tau_{cand})$ as the correlation value $\gamma_{cand}$, the inter-adjacent-channel relationship information estimation unit 1882, as with the left-right relationship information estimation unit 183 and the inter-channel relationship information estimation unit 186, may use a normalized value such as a relative difference between the absolute value of the phase difference signal $\psi(\tau_{cand})$ for each $\tau_{cand}$ and the average of the absolute values of phase difference signals obtained for a plurality of candidate numbers of samples before and after $\tau_{cand}$, for example. That is, the inter-adjacent-channel relationship information estimation unit 1882 may obtain an average value through Equation (1-5) by using the positive number $\tau_{range}$ set in advance for each $\tau_{cand}$, and use, as $\gamma_{cand}$, a normalized correlation value obtained through Equation (1-6) by using the obtained average value $\psi_c(\tau_{cand})$ and phase difference signal $\psi(\tau_{cand})$.

Inter-Channel Relationship Information Complement Unit 1883

The inter-channel correlation value and the inter-channel time difference of each pair of two channels after the sorting with adjacent channel numbers after the sorting output by the inter-adjacent-channel relationship information estimation unit 1882, and the original channel information for each channel after the sorting output by the channel sorting unit 1881 are input to the inter-channel relationship information complement unit 1883. The inter-channel relationship information complement unit 1883 obtains and outputs the inter-channel correlation value and the preceding channel information for all pairs of two channels (that is, all pairs of two channels being the sorting targets) by performing processing of step S1883-1 step S1883-5 described below (step S1883).

First, from the inter-channel correlation value of each pair of two channels after the sorting with adjacent channel numbers after the sorting, the inter-channel relationship information complement unit 1883 obtains the inter-channel correlation value of each pair of two channels after the sorting with non-adjacent channel numbers after the sorting (step S1883-1). In the case where n is an integer from 1 to N−2, m is an integer from n+2 to N, and the inter-channel correlation value between the nth sorted input sound signal and the mth sorted input sound signal is $\gamma_{nm}$, the inter-channel relationship information complement unit 1883 obtains the inter-channel correlation value $\gamma'_{nm}$ of each pair of two channels after the sorting with non-adjacent channel numbers after the sorting.

In the case where the two channel numbers of each pair of two channels after the sorting with adjacent channel numbers after the sorting are i (i is an integer from 1 to N−1) and i+1, and the inter-channel correlation value of each pair of two channels after the sorting with adjacent channel numbers after the sorting is $\gamma_{i(i+1)}$, the inter-channel relationship information complement unit 1883 obtains, as the inter-channel correlation value $\gamma'_{nm}$, a value obtained by multiplying all inter-channel correlation values $\gamma_{i(i+1)}$ of pairs of two channels with adjacent channel numbers after the sorting whose i is from n to m−1, for each pair of n and m (that is, for each pair of two channels after the sorting with non-adjacent channel numbers after the sorting), for example. That is, the inter-channel relationship information complement unit 1883 obtains the inter-channel correlation value $\gamma_{nm}$ through the following Equation (3-2).

[Math. 16]

$$\gamma'_{nm} = \prod_{i=n}^{m-1} \gamma'_{i(i+1)} \tag{3-2}$$

Note that the inter-channel relationship information complement unit 1883 may obtain, as the inter-channel correlation value $\gamma_{nm}$, the geometric mean of all the inter-channel correlation values $\gamma_{i(i+1)}$ of pairs of two channels with adjacent channel numbers after the sorting whose i is from n to m−1, for each pair of n and m (that is, for each pair of two channels after the sorting with non-adjacent channel numbers after the sorting). That is, the inter-channel relationship information complement unit 1883 may obtain the inter-channel correlation value $\gamma'_{nm}$ through the following Equation (3-3).

[Math. 17]

$$\gamma'_{nm} = \sqrt[m-n]{\prod_{i=n}^{m-1} \gamma'_{I(i+1)}} \tag{3-3}$$

It should be noted that in the case where the inter-channel correlation value is a value whose upper limit is not 1 such as the absolute value of the correlation coefficient and the normalized value, it is preferable that the inter-channel relationship information complement unit 1883 obtain the geometric mean expressed by Equation (3-3) as the inter-channel correlation value $\gamma'_{nm}$, rather than the multiplication value expressed by Equation (3-2) such that the inter-channel correlation value of each pair of two channels after the sorting with non-adjacent channel numbers after the sorting does not exceed the normal upper limit of the inter-channel correlation value.

Note that for example, for each pair of n and m (that is, for each pair of two channels after the sorting with non-adjacent channel numbers after the sorting), if there is a pair whose correlation is extremely small due to different sound signals included in two input sound signals of the pair in the pairs of two channels with adjacent channel numbers after the sorting whose i is from n to m−1, the inter-channel correlation value $\gamma'_{nm}$ may be set to a value that depends on the inter-channel correlation value $\gamma'_{i(i+1)}$ of that pair. For example, for each pair of n and m (that is, for each pair of two channels after the sorting with non-adjacent channel numbers after the sorting), the inter-channel relationship information complement unit 1883 may obtain, as the inter-channel correlation value $\gamma'_{nm}$, the minimum value of the inter-channel correlation values $\gamma'_{i(i-1)}$ of pairs of two channels with adjacent channel numbers after the sorting whose i is from n to m−1. In addition, for example, for each pair of n and m (that is, for each pair of two channels after the sorting with non-adjacent channel numbers after the sorting), the inter-channel relationship information complement unit 1883 may obtain, as the inter-channel correlation value $\gamma'_{nm}$, a multiplication value or a geometric mean of a plurality of the inter-channel correlation values $\gamma'_{i(i+1)}$ including the minimum value in the inter-channel correlation values $\gamma'_{i(i+1)}$ of pairs of two channels with adjacent channel numbers after the sorting whose i is from n to m−1. It should be noted that in the case where the inter-channel correlation value is a value whose upper limit is not 1 such as the absolute value of the correlation coefficient and the normalized value, it is preferable that the inter-channel relationship information complement unit 1883 obtain the geometric mean rather than the multiplication value as the inter-channel correlation value $\gamma'_{nm}$ such that the inter-channel correlation value of each pair of two channels after the sorting with non-adjacent channel numbers after the sorting does not exceed the normal upper limit of the inter-channel correlation value.

In short, in the case where the two channel numbers of each pair of two channels after the sorting with adjacent channel numbers after the sorting are i (i is an integer from 1 to N−1) and i+1, the inter-channel correlation value of each pair of two channels after the sorting with adjacent channel numbers after the sorting is $\gamma'_{i(i+1)}$, n is an integer from 1 to N−2, m is an integer from n+2 to N, and the inter-channel correlation value between the nth sorted input sound signal and mth sorted input sound signal is $\gamma'_{nm}$, it suffices that, for each pair of n and m (that is, for each pair of two channels after the sorting with non-adjacent channel numbers after the sorting), the inter-channel relationship information complement unit 1883 obtains, as the inter-channel correlation value $\gamma'_{nm}$, a value that has a monotonically non-decreasing relationship with each of one or more of the inter-channel correlation values $\gamma'_{i(i+1)}$ including the minimum value of the inter-channel correlation values $\gamma'_{i(i+1)}$ of pairs of two channels with adjacent channel numbers after the sorting whose i is from n to m−1. Further, in the case where the two channel numbers of each pair of two channels after the sorting with adjacent channel numbers after the sorting are i (i is an integer from 1 to N−1) and i+1, the inter-channel correlation value of each pair of two channels after the sorting with adjacent channel numbers after the sorting is $\gamma'_{i(i+1)}$, n is an integer from 1 to N−2, m is an integer from n+2 to N, and the inter-channel correlation value between the nth sorted input sound signal and mth sorted input sound signal is $\gamma'_{nm}$, it suffices that, for each pair of n and m (that is, for each pair of two channels after the sorting with non-adjacent channel numbers after the sorting), the inter-channel relationship information complement unit 1883 obtains, as the inter-channel correlation value $\gamma'_{nm}$, a value that has a monotonically non-decreasing relationship with each of one or more of the inter-channel correlation values $\gamma'_{i(i+1)}$ including the minimum value of the inter-channel correlation values $\gamma'_{i(i+1)}$ of pairs of two channels with adjacent channel numbers after the sorting whose i is from n to m−1 within the possible range of the inter-channel correlation value.

The inter-channel correlation value of each pair of two channels after the sorting with adjacent channel numbers after the sorting obtained by the inter-adjacent-channel relationship information estimation unit 1882 has been input, and the inter-channel correlation value of each pair of two channels after the sorting with non-adjacent channel numbers after the sorting is obtained at step S1883-1. Therefore, at the time point when step S1883-1 is performed, the inter-channel relationship information complement unit 1883 has all inter-channel correlation values for (N×(N−1))/2 pairs of two channels after the sorting included in the N channels after the sorting. That is, in the case where n is an integer from 1 to N, m is an integer greater than n and equal to or smaller than N, and the inter-channel correlation value between the nth sorted input sound signal and the mth sorted input sound signal is $\gamma'_{nm}$, the inter-channel relationship information complement unit 1883 has the inter-channel correlation value $\gamma'_{nm}$ for each of (N×(N−1))/2 pairs of two channels after the sorting at the time point when step S1883-1 is performed.

After step S1883-1, the inter-channel relationship information complement unit 1883 obtains the inter-channel correlation value between input sound signals for each pair of two channels included in the N channels by associating the inter-channel correlation value $\gamma'_{nm}$ for each of the (N×(N−1))/2 pairs of two channels after the sorting with a pair of channels for the input sound signals of the N channels (that is, a pair of channels being the sorting targets) by using the original channel information $c_1$ to $c_N$ for the channels after the sorting (step S1883-2). In the case where n is an integer from 1 to N, m is an integer greater than n and equal to or smaller than N, and the inter-channel correlation value between the nth channel input sound signal and the mth channel input sound signal is $\gamma_{nm}$, the inter-channel relationship information complement unit 1883 obtains the inter-channel correlation value $\gamma_{nm}$ for each of (N×(N−1))/2 pairs of two channels.

In addition, the inter-channel relationship information complement unit 1883 obtains the inter-channel time difference of each pair of two channels after the sorting with non-adjacent channel numbers after the sorting from the inter-channel time difference of each pair of two channels after the sorting with adjacent channel numbers after the sorting (step S1883-3). In the case where n is an integer from 1 to N−2, m is an integer from n+2 to N, and the inter-channel time difference between the nth channel sorted input sound signal and the mth channel sorted input sound signal is $\tau'_{nm}$, the inter-channel relationship information complement unit 1883 obtains an inter-channel time difference $\tau'_{nm}$ of each pair of two channels after the sorting with non-adjacent channel numbers after the sorting. In the case where the two channel numbers of each pair of two channels after the sorting with adjacent channel numbers after the sorting are i (i is an integer from 1 to N−1) and i+1, and the inter-channel time difference of each pair of two channels after the sorting with adjacent channel numbers after the sorting is $\tau'_{i(i+1)}$, the inter-channel relationship information complement unit 1883 obtains, as the inter-channel time difference $\tau'_{nm}$, a value obtained by adding up all of inter-channel time differences $\tau'_{i(i+1)}$ of pairs of two channels with adjacent channel numbers after the sorting whose i is from n to m−1, for each pair of n and m (that is, for each pair of two channels after the sorting with non-adjacent channel numbers after the sorting). That is, the inter-channel relationship information complement unit 1883 obtains the inter-channel time difference $\tau'_{nm}$ through the following Equation (34).

[Math. 18]

$$\tau'_{nm} = \sum_{i=n}^{m-1} \tau'_{i(i+1)} \tag{3-4}$$

The inter-channel time difference of each pair of two channels after the sorting with adjacent channel numbers after the sorting obtained by the inter-adjacent-channel relationship information estimation unit 1882 has been input, and the inter-channel time difference of each pair of two channels after the sorting with non-adjacent channel numbers after the sorting is obtained at step S1883-3. Therefore, at the time point when step S1883-3 is performed, the inter-channel relationship information complement unit 1883 has all the inter-channel time differences of (N×(N−1))/2 pairs of two channels after the sorting included in the N channels after the sorting. That is, in the case where n is an integer from 1 to N, m is an integer greater than n and equal to or smaller than N, and the inter-channel time difference of the pair of the nth channel after the sorting and the mth channel after the sorting is $\tau'_{nm}$, the inter-channel relationship information complement unit 1883 has the inter-channel time difference $\tau'_{nm}$ of each of the (N×(N−1))/2 pairs of two channels after the sorting at the time point when step S1883-3 is performed.

After step S1883-3, the inter-channel relationship information complement unit 1883 obtains the inter-channel time difference between input sound signals for each pair of two channels included in the N channels by associating the inter-channel time difference $\tau'_{nm}$ for each of the (N×(N−1))/2 pairs of two channels after the sorting with a pair of channels for the input sound signal of the N channels (that is, a pair of channels being the sorting targets) by using the original channel information $c_1$ to $C_N$ for the channels after the sorting (step S1883-4). In the case where n is an integer from 1 to N, m is an integer greater than n and equal to or smaller than N, and the inter-channel time difference between the nth channel input sound signal and the mth channel input sound signal is $\tau_{nm}$, the inter-channel relationship information complement unit 1883 obtains the inter-channel time difference $\tau_{nm}$ of each of the (N×(N−1))/2 pairs of two channels.

After step S1883-4, the inter-channel relationship information complement unit 1883 obtains the preceding channel information $INFO_{nm}$ of each of the (N×(N−1))/2 pairs of two channels from the inter-channel time difference $\tau_{nm}$ of each of the (N×(N−1))/2 pairs of two channels (step S1883-5). The inter-channel relationship information complement unit 1883 obtains information indicating that the nth channel is preceding as the preceding channel information $INFO_{nm}$ when the inter-channel time difference $\tau_{nm}$ is a positive value, and obtains information indicating that the mth channel is preceding as the preceding channel information $INFO_{nm}$ when the inter-channel time difference $\tau_{nm}$ is a negative value. The inter-channel relationship information complement unit 1883 may obtain, for each pair of two channels, information indicating that the nth channel is preceding as the preceding channel information $INFO_{nm}$ when the inter-channel time difference $\tau_{nm}$ is zero, or information indicating that the mth channel is preceding as the preceding channel information $INFO_{nm}$.

Note that instead of step S1883-4 and step S1883-5, the inter-channel relationship information complement unit 1883 may perform step S1883-4' of obtaining preceding channel information $INFO'_{nm}$ from the inter-channel time difference $\tau'_{nm}$ as in step S1883-5 for each of the (N×(N−1))/2 pairs of two channels after the sorting, and step S1883-5' of obtaining the preceding channel information $INFO_{nm}$ of each pair of two channels included in the N channels by associating the preceding channel information $INFO'_{nm}$ for each of the (N×(N−1))/2 pairs of two channels after the sorting obtained at step S1883-4' with a pair of channels for the input sound signals of the N channels (that is, a pair of channels being the sorting targets) by using the original channel information $c_1$ to $c_N$ for the channels after the sorting. That is, it suffices that the inter-channel relationship information complement unit 1883 obtains the preceding channel information $INFO_{nm}$ of each pair of two channels included in the N channels by establishing an association with a pair of channels for the input sound signals of the N channels using the original channel information $c_1$ to $c_N$, from the inter-channel time difference $\tau'_{nm}$ of each of the (N×(N−1))/2 pairs of two channels after the sorting, and by obtaining the preceding channel information based on whether the inter-channel time difference is positive, negative or zero.

Second Example

Instead of the inter-channel relationship information estimation unit 186 of the second example of the second embodiment, the inter-channel relationship information estimation unit 188 of the first example of the third embodiment may be used. In this case, it suffices that the inter-channel relationship information obtaining unit 187 of the sound signal downmix apparatus 407 includes the inter-channel relationship information estimation unit 188 instead of the inter-channel relationship information estimation unit 186, and that the inter-channel relationship information obtaining unit 187 performs an operation in which the inter-channel relationship information estimation unit 186 is read as the inter-channel relationship information estimation unit 188. In this case, the sound signal downmix apparatus 407 has the apparatus configuration exemplified in FIG. 7, and the sound signal downmix apparatus 407 performs the processing as exemplified in FIG. 8.

Fourth Embodiment

It is possible to provide the sound signal downmix apparatus of the second and third embodiments as a sound signal downmix unit in a coding apparatus for coding sound signals, and this configuration will be described as a fourth embodiment.

Sound Signal Coding Apparatus 106

Figure 13:
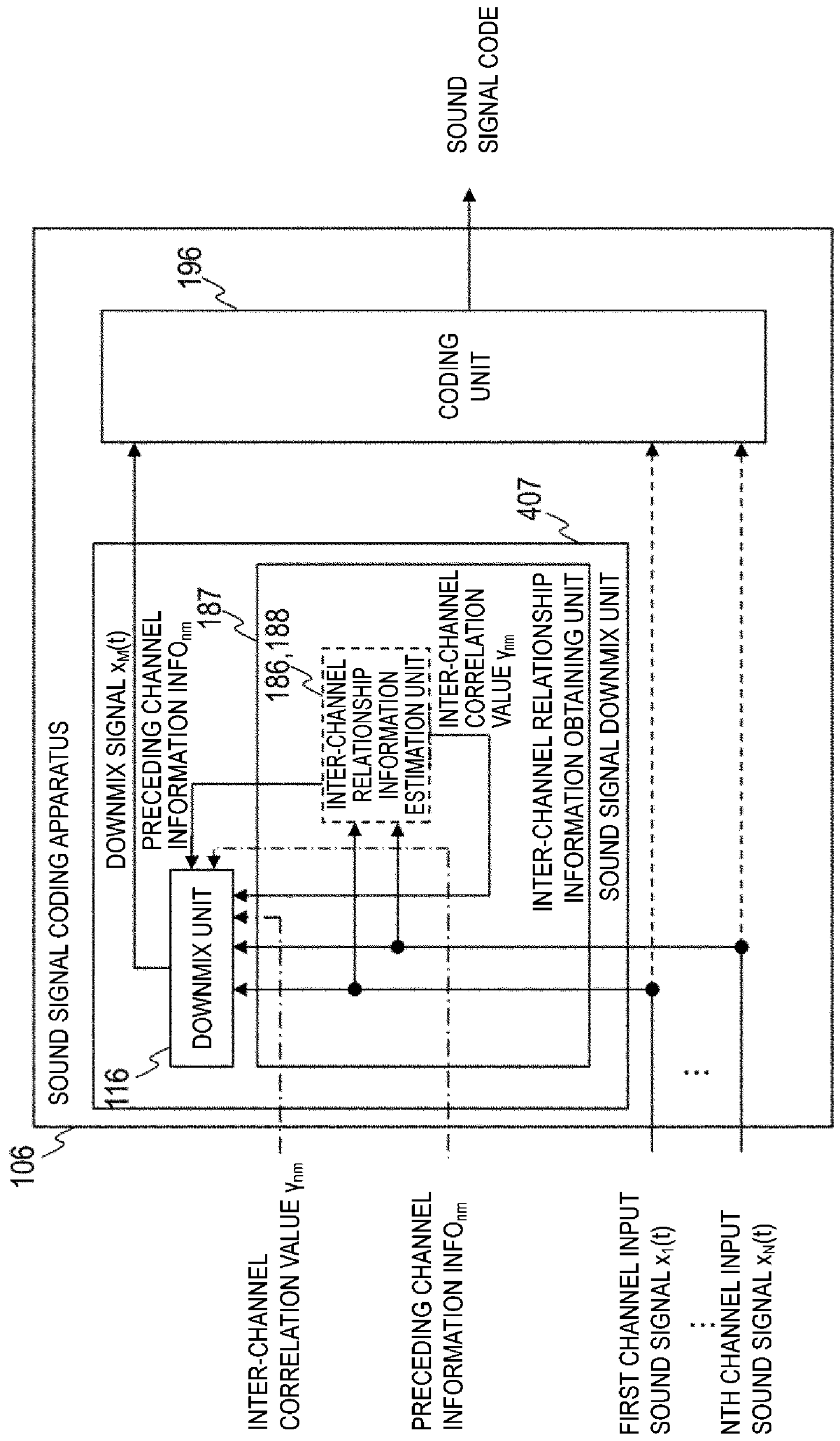
FIG. 13 is a block diagram illustrating an example of a sound signal coding apparatus of a fourth embodiment.
Figure 14:
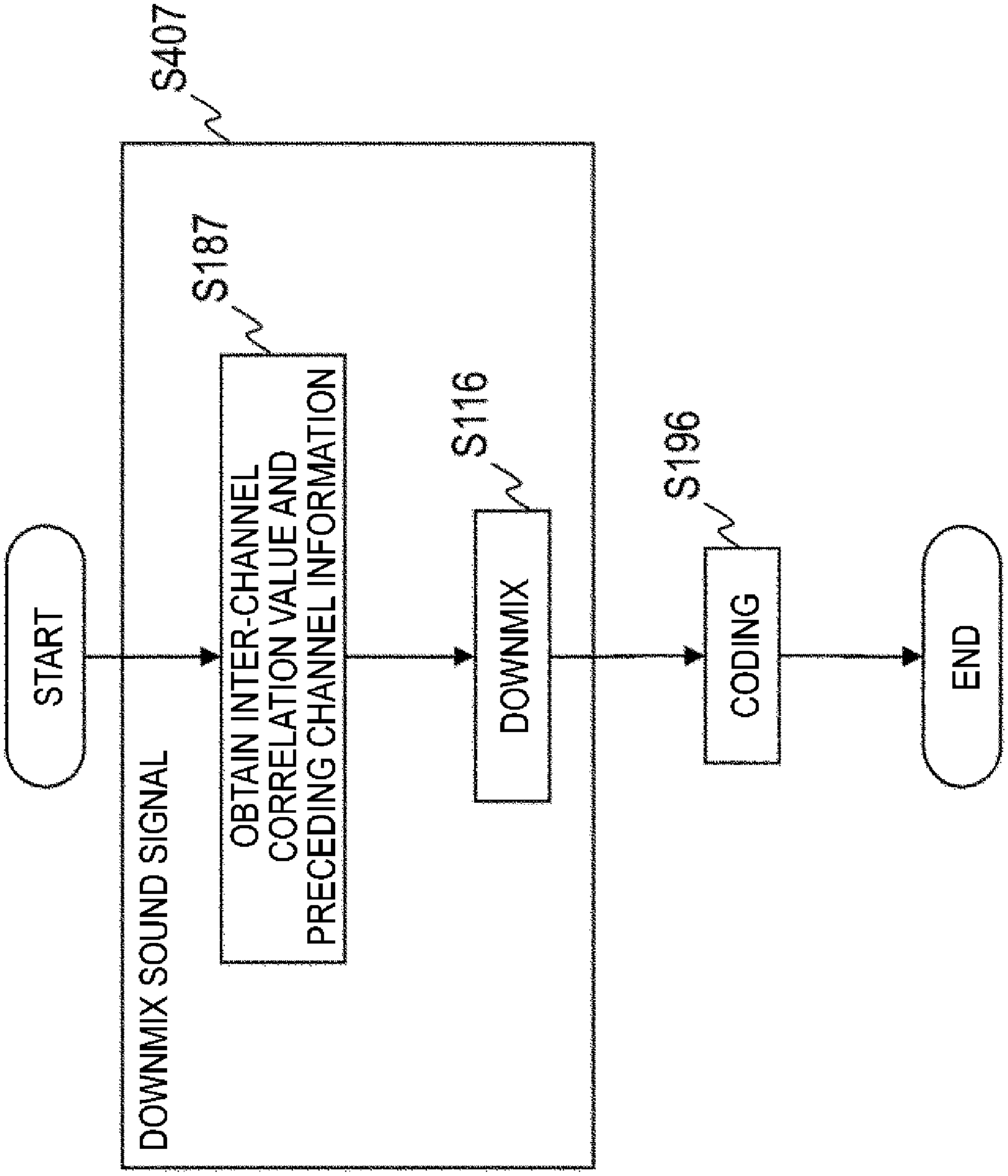
FIG. 14 is a flowchart of an example of processing of the sound signal coding apparatus of the fourth embodiment.

As illustrated in FIG. 13, a sound signal coding apparatus 106 of the fourth embodiment includes a sound signal downmix unit 407 and a coding unit 196. The sound signal coding apparatus 106 of the fourth embodiment obtains and outputs a sound signal code by performing coding of an input time-domain sound signal of N-channel stereo in a frame unit of a predetermined time length of, for example, 20 ms. The time-domain sound signal of N-channel stereo to be input to the sound signal coding apparatus 106 is, for example, a digital voice signal or an acoustic signal obtained through an AD conversion of a sound such as a voice and music picked up by each of N microphones, and is composed of N input sound signals of the first channel input sound signal to the Nth channel input sound signal. A sound signal code output by the coding apparatus is input to the decoding apparatus. A sound signal coding apparatus 105 of the fourth embodiment performs processing of step S407 and step S196 exemplified in FIG. 14 for each frame. The sound signal coding apparatus 106 of the fourth embodiment will be described with reference to the second embodiment and the third embodiment as appropriate.

Sound Signal Downmix Unit 407

The sound signal downmix unit 407 obtains and outputs a downmix signal from N input sound signals of the first channel input sound signal to the Nth channel input sound signal input to the sound signal coding apparatus 106 (step S407). As with the sound signal downmix apparatus 407 of the second embodiment or the third embodiment, the sound signal downmix unit 407 includes the inter-channel relationship information obtaining unit 187 and the downmix unit 116. The inter-channel relationship information obtaining unit 187 performs the above-described step S187, and the downmix unit 116 performs the above-described step S116. That is, the sound signal coding apparatus 106 includes the sound signal downmix apparatus 407 of the second embodiment or the third embodiment as the sound signal downmix unit 407, and performs the processing of the sound signal downmix apparatus 407 of the second embodiment or the third embodiment as step S407.

Coding Unit 196

At least the downmix signal output by the sound signal downmix unit 407 is input to the coding unit 196. The coding unit 196 obtains a sound signal code by performing at least coding on the input downmix signal, and outputs the signal (step S196). The coding unit 196 may also perform coding on N input sound signals of the first channel input sound signal to the Nth channel input sound signal, and may output the sound signal code including the code obtained through the coding. In this case, as indicated with the broken line in FIG. 13, N input sound signals of the first channel input sound signal to the Nth channel input sound signal are also input to the coding unit 196.

The coding processing performed by the coding unit 196 is not limited. For example, a sound signal code may be obtained by performing coding on the downmix signals $x_M(1), x_M(2) \ldots, x_M(T)$ of input T samples by a monaural coding scheme such as 3GPP EVS standard. Moreover, for example, in addition to obtaining a monaural code by coding a downmix signal, a stereo code may be obtained by coding N input sound signals of the first channel input sound signal to the Nth channel input sound signal by a stereo coding scheme supporting a stereo decoding scheme of MPEG-4 AAC standard, and a combination of the monaural code and the stereo code may be obtained and output as a sound signal code. Furthermore, for example, in addition to obtaining a monaural code by coding a downmix signal, a stereo code may be obtained by performing coding on the weighted difference and the difference from the downmix signal for each channel for N input sound signals of the first channel input sound signal to the Nth channel input sound signal, and a combination of the monaural code and the stereo code may be obtained and output as a sound signal code.

Fifth Embodiment

It is possible to provide the sound signal downmix apparatus of the second embodiment and the third embodiment as a sound signal downmix unit in a signal processing apparatus for processing a sound signal, and this configuration is described as a fifth embodiment below.

Sound Signal Processing Apparatus 306

Figure 15:
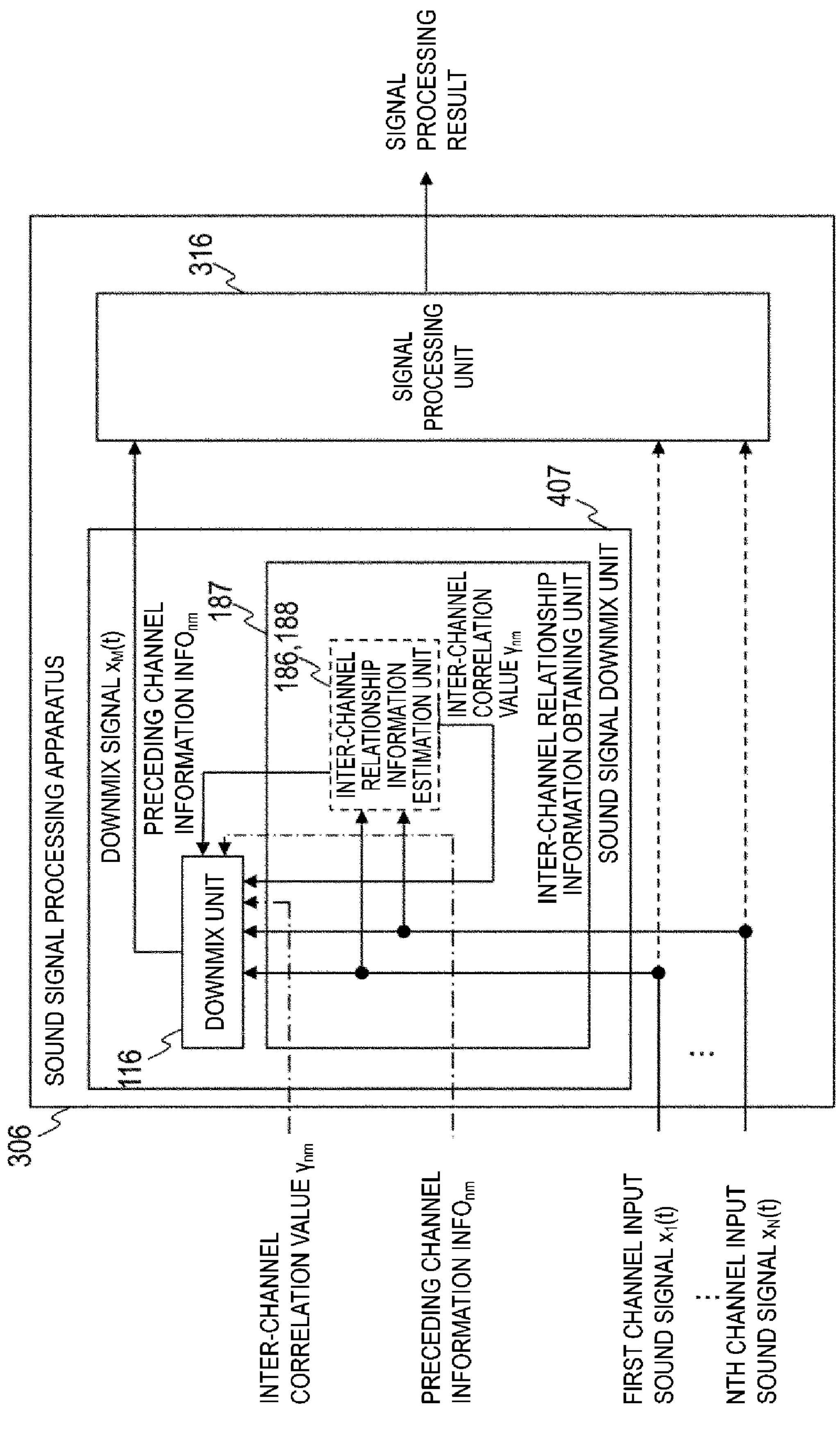
FIG. 15 is a block diagram illustrating an example of a sound signal processing apparatus of a fifth embodiment.
Figure 16:
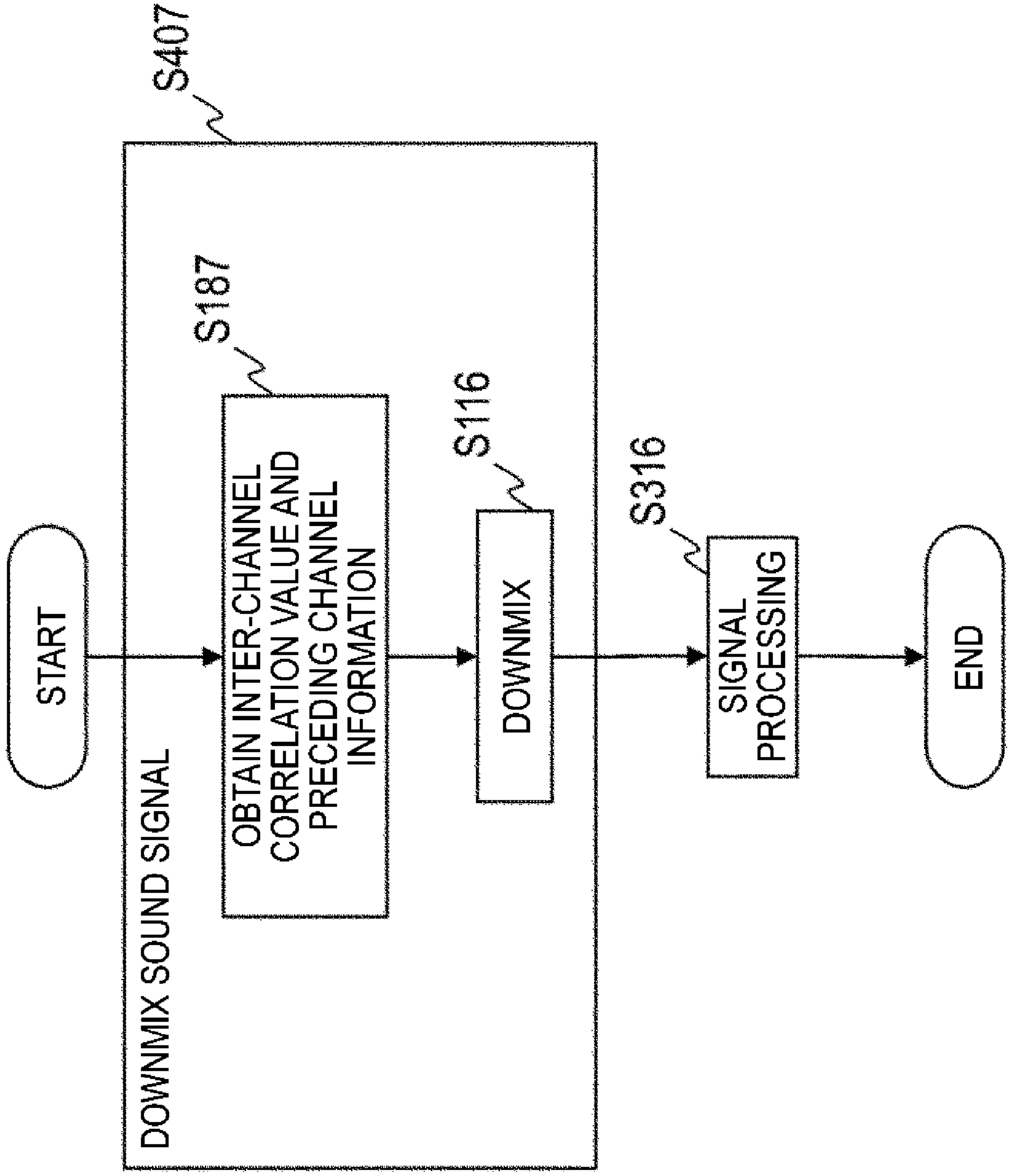
FIG. 16 is a flowchart of an example of processing of the sound signal processing apparatus of the fifth embodiment.

As illustrated in FIG. 15, a sound signal processing apparatus 306 of the fifth embodiment includes the sound signal downmix unit 407 and a signal processing unit 316. The sound signal processing apparatus 306 of the fifth embodiment performs a signal processing on an input time-domain sound signal of N-channel stereo in a frame unit of a predetermined time length of, for example, 20 ms, and thus obtains and outputs a signal processing result. Examples of the time-domain sound signal of N-channel stereo input to the sound signal processing apparatus 306 include a digital voice signal or an acoustic signal obtained through an AD conversion of a sound such as a voice and music picked up by N microphones, a digital voice signal or an acoustic signal obtained by processing the digital voice signal or acoustic signal, and, a digital decoding voice signal or a decoding acoustic signal obtained through decoding of a stereo code at a decoding apparatus. The time-domain sound signal of N-channel stereo is composed of N input sound signals of the first channel input sound signal to the Nth channel input sound signal. The sound signal processing apparatus 306 of the fifth embodiment performs processing of step S407 and step S316 exemplified in FIG. 16 for each frame. The sound signal processing apparatus 306 of the fifth embodiment will be described with reference to the second embodiment and the third embodiment as appropriate.

Sound Signal Downmix Unit 407

The sound signal downmix unit 407 obtains a downmix signal from the N input sound signals of the first channel input sound signal to the Nth channel input sound signal input to the sound signal processing apparatus 306, and outputs the downmix signal (step S407). As with the sound signal downmix apparatus 407 of the second embodiment or the third embodiment, the sound signal downmix unit 407 includes the inter-channel relationship information obtaining unit 187 and the downmix unit 116. The inter-channel relationship information obtaining unit 187 performs the above-described step S187, and the downmix unit 116 performs the above-described step S116. That is, the sound signal processing apparatus 306 includes the sound signal downmix apparatus 407 of the second embodiment or the third embodiment as the sound signal downmix unit 407, and performs the processing of the sound signal downmix apparatus 407 of the second embodiment or the third embodiment as step S407.

Signal Processing Unit 316

At least the downmix signal output by the sound signal downmix unit 407 is input to the signal processing unit 316. The signal processing unit 316 performs at least signal processing on the input downmix signal, and obtains and outputs a signal processing result (step S316). The signal processing unit 316 may also perform a signal processing on the N input sound signals of the first channel input sound signal to the Nth channel input sound signal and obtain a signal processing result. In this case, as indicated with the broken line in FIG. 15, the N input sound signals of the first channel input sound signal to the Nth channel input sound signal are also input to the signal processing unit 316, and the signal processing unit 316 performs a signal processing using a downmix signal on the input sound signal of each channel, and obtains an output sound signal of each channel as a signal processing result, for example.

Program and Recording Medium

Figure 17:
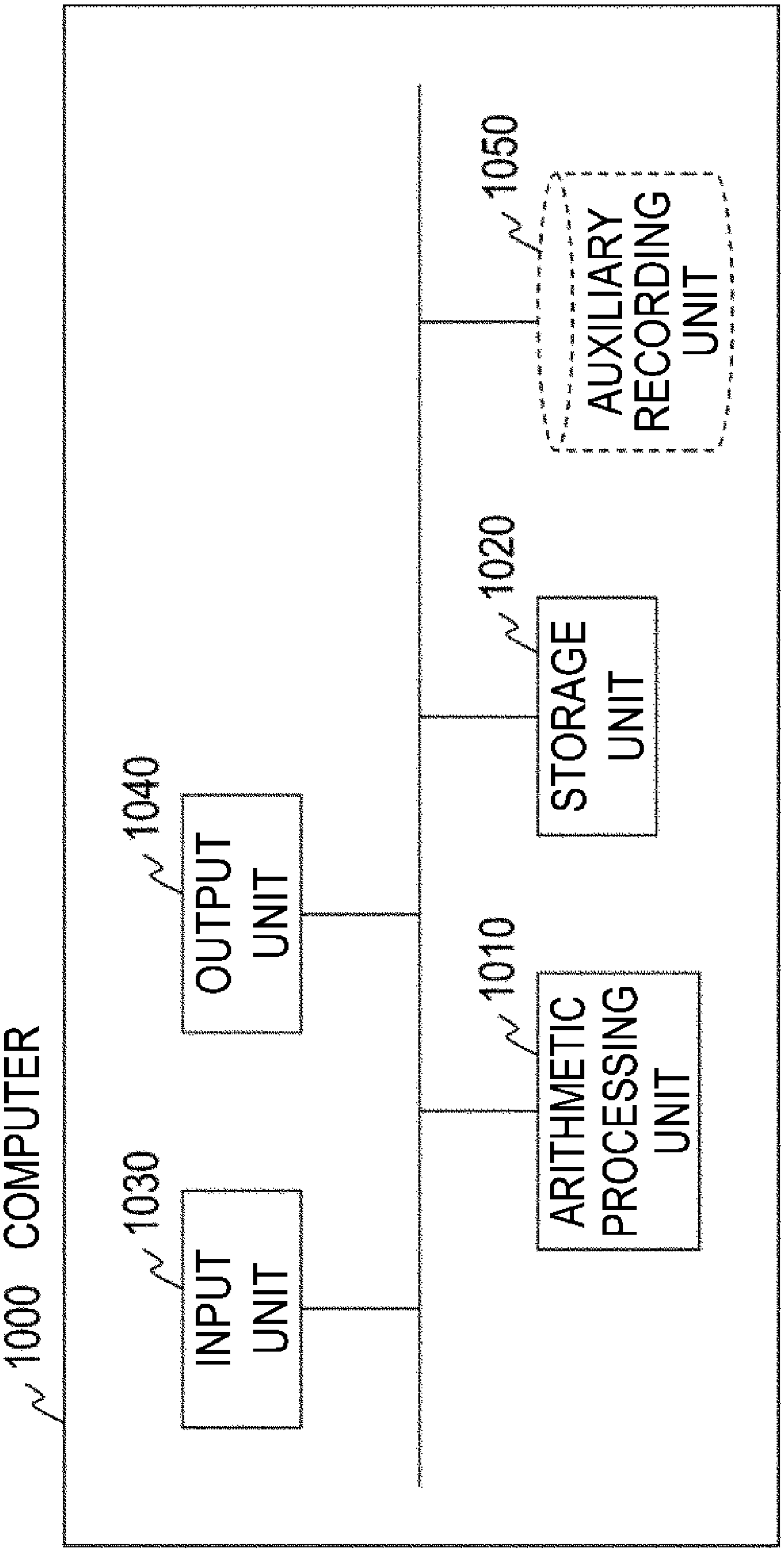
FIG. 17 is a diagram illustrating an example of a functional configuration of a computer that implements apparatuses of the embodiments of the present disclosure.

The processing of each unit of each sound signal downmix apparatus, sound signal coding apparatus and sound signal processing apparatus may be implemented using a computer, and in this case, the processing detail of the function that should be provided in each apparatus is described in a program. When this program is read in a storage unit 1020 of a computer 1000 illustrated in FIG. 17 to operate an arithmetic processing unit 1010, an input unit 1030, an output unit 1040 and the like, the various processing function in each apparatus is implemented on the computer.

A program in which processing content thereof has been described can be recorded on a computer-readable recording medium. The computer-readable recording medium is, for example, a non-temporary recording medium, specifically, a magnetic recording device, an optical disk, or the like.

Further, distribution of this program is performed, for example, by selling, transferring, or renting a portable recording medium such as a DVD or CD-ROM on which the program has been recorded. Further, the program may be distributed by being stored in a storage device of a server computer and transferred from the server computer to another computer via a network.

For example, a computer executing such a program first temporarily stores the program recorded on the portable recording medium or the program transmitted from the server computer in an auxiliary recording unit 1050 that is its own non-temporary storage device. Then, when executing the processing, the computer reads the program stored in the auxiliary recording unit 1050 that is its own storage device to the storage unit 1020 and executes the processing in accordance with the read program. Further, as another execution mode of this program, the computer may directly read the program from the portable recording medium to the storage unit 1020 and execute processing in accordance with the program, or, further, may sequentially execute the processing in accordance with the received program each time the program is transferred from the server computer to the computer. Further, a configuration in which the above-described processing is executed by a so-called application service provider (ASP) type service for implementing a processing function according to only an execution instruction and result acquisition without transferring the program from the server computer to the computer may be adopted. It is assumed that the program in the present embodiment includes information provided for processing of an electronic calculator and being pursuant to the program (such as data that is not a direct command to the computer, but has properties defining processing of the computer).

Further, in this embodiment, although the present device is configured by a predetermined program being executed on the computer, at least a part of processing content of thereof may be achieved by hardware.

It is needless to say that the present disclosure can appropriately be modified without departing from the gist of the present disclosure.

The invention claimed is:

1. A sound signal downmix method of obtaining a downmix signal that is a monaural sound signal from input sound signals of N channels, N being an integer of three or greater, the sound signal downmix method comprising:

an inter-channel relationship information obtaining step of obtaining an inter-channel correlation value and preceding channel information of every pair of two channels included in the N channels, the inter-channel correlation value being a value indicating a degree of a correlation between input sound signals of the two channels, the preceding channel information being information indicating which of the input sound signals of the two channels is preceding; and a downmix step of obtaining the downmix signal by weighting and adding the input sound signals of the N channels, the input sound signal of each channel being weighted based on the inter-channel correlation value and the preceding channel information such that the larger a correlation with an input sound signal of a preceding channel that precedes the channel, the smaller a weight, whereas the larger a correlation with an input sound signal of a succeeding channel that succeeds the channel, the larger the weight.

2. The sound signal downmix method according to claim 1, wherein the inter-channel correlation value is a value from 0 to 1, a sample number is denoted as t, every sample of the input sound signal of an ith channel whose i is from 1 to N is denoted as $x_i(t)$, and every sample of the downmix signal is denoted as $x_M(t)$, and the downmix step include obtaining every sample $x_M(t)$ of the downmix signal, wherein a set of channel numbers of channels preceding the ith channel is denoted as $I_{Li}$, a set of channel numbers of channels succeeding the ith channel is denoted as $I_{Fi}$, the inter-channel correlation value of a pair of the ith channel and every channel j preceding the ith channel is denoted as $\gamma_{ij}$, the inter-channel correlation value of a pair of the ith channel and every channel k succeeding the ith channel is denoted as $\gamma_{ik}$, a weight of the ith channel is denoted as $w_i$, $w_i$ being expressed by

[Math 19]

$$w_i = \frac{1}{N}\prod_{j\in I_{Li}}(1-\gamma_{ij})\left(1+\sum_{k\in I_{Fi}}\gamma_{ik}\right),$$

every sample $x_M(t)$ of the downmix signal is obtained by

[Math 20]

$$x_M(t) = \sum_{i=1}^{N} w_i \times x_i(t).$$

3. A sound signal coding method comprising:

the sound signal downmix method according to claim 1 as a sound signal downmix step;

a monaural coding step of obtaining a monaural code by coding the downmix signal obtained in the downmix step; and a stereo coding step of obtaining a stereo code by coding the input sound signals of the N channels.

4. A sound signal downmix apparatus configured to obtain a downmix signal that is a monaural sound signal from input sound signals of N channels, N being an integer of three or greater, the sound signal downmix apparatus comprising:

an inter-channel relationship information obtaining unit configured to obtain an inter-channel correlation value and preceding channel information of every pair of two channels included in the N channels, the inter-channel correlation value being a value indicating a degree of a correlation between input sound signals of the two channels, the preceding channel information being information indicating which of the input sound signals of the two channels is preceding; and a downmix unit configured to obtain the downmix signal by weighting and adding the input sound signals of the N channels, the input sound signal of each channel being weighted based on the inter-channel correlation value and the preceding channel information such that the larger a correlation with an input sound signal of a preceding channel that precedes the channel, the smaller a weight, whereas the larger a correlation with an input sound signal of a succeeding channel that succeeds the channel, the larger the weight.

5. The sound signal downmix apparatus according to claim 4, wherein the inter-channel correlation value is a value from 0 to 1, a sample number is denoted as t, every sample of the input sound signal of an ith channel whose i is from 1 to N is denoted as $x_i(t)$, and every sample of the downmix signal is denoted as $x_M(t)$, and the downmix unit obtains every sample $x_M(t)$ of the downmix signal, wherein a set of channel numbers of channels preceding the ith channel is denoted as $I_{Li}$, a set of channel numbers of channels succeeding the ith channel is denoted as $I_{Fi}$, the inter-channel correlation value of a pair of the ith channel and every channel j preceding the ith channel is denoted as $\gamma_{ij}$, the inter-channel correlation value of a pair of the ith channel and every channel k succeeding the ith channel is denoted as $\gamma_{ik}$, a weight of the ith channel is denoted as $w_i$, $w_i$ being expressed by

[Math 21]

$$w_i = \frac{1}{N}\prod_{j\in I_{Li}}(1-\gamma_{ij})\left(1+\sum_{k\in I_{Fi}}\gamma_{ik}\right),$$

sample $x_M(t)$ of the downmix signal is obtained by

[Math 22]

$$x_M(t) = \sum_{i=1}^{N} w_i \times x_i(t).$$

6. A sound signal coding apparatus comprising:

the sound signal downmix apparatus according to claim 4 as a sound signal downmix unit;

a monaural coding unit configured to obtain a monaural code by coding the downmix signal obtained by the downmix unit; and a stereo coding unit configured to obtain a stereo code by coding the input sound signals of the N channels.

7. A non-transitory computer-readable recording medium storing a program causing a computer to execute processing of each step of the sound signal downmix method according to claim 1.

8. A non-transitory computer-readable recording medium storing a program causing a computer to execute processing of each step of the sound signal coding method according to claim 3.

* * * * *